(12) United States Patent
Harrold et al.

(10) Patent No.: US 9,709,723 B2
(45) Date of Patent: Jul. 18, 2017

(54) DIRECTIONAL BACKLIGHT

(71) Applicant: REALD INC., Beverly Hills, CA (US)

(72) Inventors: Jonathan Harrold, Leamington Spa (GB); Graham J. Woodgate, Henley on Thames (GB); Michael G. Robinson, Boulder, CO (US); Miller H. Schuck, Erie, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 147 days.

(21) Appl. No.: 13/897,261

(22) Filed: May 17, 2013

(65) Prior Publication Data

US 2013/0321913 A1    Dec. 5, 2013

Related U.S. Application Data

(60) Provisional application No. 61/649,124, filed on May 18, 2012.

(51) Int. Cl.
F21V 8/00 (2006.01)
G02B 27/22 (2006.01)

(52) U.S. Cl.
CPC ........... *G02B 6/0028* (2013.01); *G02B 27/22* (2013.01); *G02B 27/225* (2013.01); *G02B 27/2242* (2013.01); *G02B 27/2264* (2013.01); *G02B 6/0048* (2013.01)

(58) Field of Classification Search
CPC .. G02B 6/0028; G02B 27/22; G02B 27/2242; G02B 27/225; G02B 27/2264; G02B 6/0048

USPC ......... 359/464, 599; 362/606, 610–612, 615, 362/619–621
See application file for complete search history.

(56) References Cited

U.S. PATENT DOCUMENTS

| | | |
|---|---|---|
| 1,128,979 A | 2/1915 | Hess |
| 1,970,311 A | 8/1934 | Ives |
| 2,133,121 A | 10/1938 | Stearns |
| 2,247,969 A | 7/1941 | Lemuel |

(Continued)

FOREIGN PATENT DOCUMENTS

| | | |
|---|---|---|
| CN | 1142869 A | 2/1997 |
| CN | 1377453 A | 10/2002 |

(Continued)

OTHER PUBLICATIONS

Languy et al., "Performance comparison of four kinds of flat nonimaging Fresnel lenses made of polycarbonates and polymethyl methacrylate for concentrated photovoltaics", Optics Letters, 36, p. 2743-p. 2745.*

(Continued)

*Primary Examiner* — Bumsuk Won
*Assistant Examiner* — Wen Huang
(74) *Attorney, Agent, or Firm* — Penny L. Lowry; Neil G. Mothew

(57) ABSTRACT

Disclosed is an optical inline light guiding apparatus which may include a substantially parallel planar light expansion section and a light extraction section comprising a stepped structure, in which the steps may be extraction features and guiding features. Such controlled illumination may provide for efficient, multi-user autostereoscopic displays with wide viewing freedom, high efficiency and low cross talk and other directional display uses.

14 Claims, 24 Drawing Sheets

(56) References Cited

U.S. PATENT DOCUMENTS

| | | |
|---|---|---|
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,850,580 A | 12/1998 | Taguchi et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,959,702 A | 9/1999 | Goodman |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,044,196 A | 3/2000 | Winston et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,144,118 A | 11/2000 | Cahill et al. |
| 6,172,723 B1 | 1/2001 | Inoue et al. |
| 6,199,995 B1 | 3/2001 | Umemoto |
| 6,219,113 B1 | 4/2001 | Takahara |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,335,999 B1 | 1/2002 | Winston et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,481,849 B2 | 11/2002 | Martin et al. |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,798,406 B1 | 9/2004 | Jones et al. |
| 6,801,243 B1 | 10/2004 | Berkel |
| 6,816,158 B1 | 11/2004 | Lemelson et al. |
| 6,825,985 B2 | 11/2004 | Brown et al. |
| 6,847,354 B2 | 1/2005 | Vranish |
| 6,847,488 B2 | 1/2005 | Travis |
| 6,859,240 B1 | 2/2005 | Brown et al. |
| 6,867,828 B2 | 3/2005 | Taira et al. |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate |
| 7,073,933 B2 | 7/2006 | Gotoh et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,415 B2 | 5/2007 | Maehara |
| 7,215,475 B2 | 5/2007 | Woodgate et al. |
| 7,227,567 B1 | 6/2007 | Beck et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,528,893 B2 | 5/2009 | Schultz |
| 7,545,429 B2 | 6/2009 | Travis |
| 7,587,117 B2 | 9/2009 | Winston et al. |
| 7,614,777 B2 | 11/2009 | Koganezawa et al. |
| 7,660,047 B1 | 2/2010 | Travis et al. |
| 7,750,981 B2 | 7/2010 | Shestak |
| 7,750,982 B2 | 7/2010 | Nelson |
| 7,771,102 B2 | 8/2010 | Iwasaki |
| 7,798,699 B2 | 9/2010 | Laitinen et al. |
| 7,944,428 B2 | 5/2011 | Travis |
| 7,970,246 B2 | 6/2011 | Travis et al. |
| 7,976,208 B2 | 7/2011 | Travis |
| 8,016,475 B2 | 9/2011 | Travis |
| 8,179,361 B2 | 5/2012 | Sugimoto et al. |
| 8,216,405 B2 | 7/2012 | Emerton |
| 8,223,296 B2 | 7/2012 | Lee et al. |
| 8,251,562 B2 | 8/2012 | Kuramitsu et al. |
| 8,325,295 B2 | 12/2012 | Sugita |
| 8,354,806 B2 | 1/2013 | Travis |
| 8,477,261 B2 | 7/2013 | Travis |
| 8,502,253 B2 | 8/2013 | Min |
| 8,534,901 B2 | 9/2013 | Panagotacos |
| 8,556,491 B2 | 10/2013 | Lee |
| 8,651,725 B2 | 2/2014 | Le et al. |
| 8,684,588 B2 | 4/2014 | Ajichi et al. |
| 8,714,804 B2 | 5/2014 | Kim et al. |
| 8,752,995 B2 | 6/2014 | Park |
| 8,760,762 B1 | 6/2014 | Kelly et al. |
| 8,926,112 B2 | 1/2015 | Uchiike et al. |
| 8,942,434 B1 | 1/2015 | Karakotsios et al. |
| 9,188,731 B2 | 11/2015 | Woodgate et al. |
| 9,197,884 B2 | 11/2015 | Lee et al. |
| 9,350,980 B2 | 5/2016 | Robinson et al. |
| 9,519,153 B2 | 12/2016 | Robinson et al. |
| 2001/0001566 A1 | 5/2001 | Moseley et al. |
| 2001/0050686 A1 | 12/2001 | Allen |
| 2002/0018299 A1 | 2/2002 | Daniell |
| 2002/0113246 A1 | 8/2002 | Nagai et al. |
| 2002/0113866 A1 | 8/2002 | Taniguchi et al. |
| 2003/0046839 A1 | 3/2003 | Oda et al. |
| 2003/0117790 A1 | 6/2003 | Lee et al. |
| 2003/0133191 A1 | 7/2003 | Morita et al. |
| 2003/0137738 A1 | 7/2003 | Ozawa et al. |
| 2003/0137821 A1 | 7/2003 | Gotoh et al. |
| 2004/0008877 A1 | 1/2004 | Leppard et al. |
| 2004/0015729 A1 | 1/2004 | Elms et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1* | 9/2004 | Kim et al. ............... 362/31 |
| 2004/0263968 A1 | 12/2004 | Kobayashi et al. |
| 2004/0263969 A1 | 12/2004 | Lipton et al. |

(56) References Cited

U.S. PATENT DOCUMENTS

| | | |
|---|---|---|
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0174768 A1 | 8/2005 | Conner |
| 2005/0180167 A1* | 8/2005 | Hoelen et al. ............... 362/613 |
| 2005/0190180 A1 | 9/2005 | Jin et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1* | 12/2006 | Niioka et al. ............... 362/607 |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115552 A1 | 5/2007 | Robinson et al. |
| 2007/0153160 A1 | 7/2007 | Lee et al. |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2007/0279554 A1 | 12/2007 | Kowarz et al. |
| 2007/0279727 A1 | 12/2007 | Gandhi et al. |
| 2008/0079662 A1 | 4/2008 | Saishu et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0014700 A1 | 1/2009 | Metcalf et al. |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0109705 A1 | 4/2009 | Pakhchyan et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1* | 7/2009 | Minano et al. ............... 345/84 |
| 2009/0168459 A1 | 7/2009 | Holman et al. |
| 2009/0174700 A1 | 7/2009 | Daiku |
| 2009/0174840 A1 | 7/2009 | Lee et al. |
| 2009/0190072 A1 | 7/2009 | Nagata et al. |
| 2009/0190079 A1 | 7/2009 | Saitoh |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2009/0315915 A1 | 12/2009 | Dunn et al. |
| 2010/0040280 A1 | 2/2010 | McKnight |
| 2010/0053771 A1 | 3/2010 | Travis et al. |
| 2010/0053938 A1 | 3/2010 | Kim et al. |
| 2010/0091093 A1 | 4/2010 | Robinson |
| 2010/0091254 A1 | 4/2010 | Travis |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche |
| 2010/0220260 A1 | 9/2010 | Sugita et al. |
| 2010/0231498 A1 | 9/2010 | Large |
| 2010/0271838 A1 | 10/2010 | Yamaguchi |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0321953 A1 | 12/2010 | Coleman et al. |
| 2010/0328438 A1 | 12/2010 | Ohyama et al. |
| 2011/0013417 A1 | 1/2011 | Saccomanno et al. |
| 2011/0019112 A1 | 1/2011 | Dolgoff |
| 2011/0032483 A1 | 2/2011 | Hiruska et al. |
| 2011/0043142 A1 | 2/2011 | Travis et al. |
| 2011/0043501 A1 | 2/2011 | Daniel |
| 2011/0044056 A1 | 2/2011 | Travis |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0199459 A1 | 8/2011 | Barenbrug et al. |
| 2011/0211142 A1 | 9/2011 | Kashiwagi et al. |
| 2011/0216266 A1 | 9/2011 | Travis |
| 2011/0221998 A1 | 9/2011 | Adachi et al. |
| 2011/0228562 A1 | 9/2011 | Travis et al. |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0267563 A1 | 11/2011 | Shimizu |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0056971 A1 | 3/2012 | Kumar et al. |
| 2012/0062991 A1 | 3/2012 | Krijn et al. |
| 2012/0063166 A1 | 3/2012 | Panagotacos et al. |
| 2012/0075285 A1 | 3/2012 | Oyagi et al. |
| 2012/0081920 A1 | 4/2012 | Ie et al. |
| 2012/0086776 A1 | 4/2012 | Lo |
| 2012/0092435 A1 | 4/2012 | Wohlert |
| 2012/0106193 A1 | 5/2012 | Kim et al. |
| 2012/0127573 A1 | 5/2012 | Robinson et al. |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0236484 A1 | 9/2012 | Miyake |
| 2012/0243204 A1 | 9/2012 | Robinson |
| 2012/0293721 A1 | 11/2012 | Ueyama |
| 2012/0299913 A1 | 11/2012 | Robinson et al. |
| 2012/0314145 A1 | 12/2012 | Robinson |
| 2012/0327172 A1 | 12/2012 | El-Saban et al. |
| 2013/0101253 A1 | 4/2013 | Popovich et al. |
| 2013/0107340 A1 | 5/2013 | Wong et al. |
| 2013/0127861 A1 | 5/2013 | Gollier |
| 2013/0135588 A1 | 5/2013 | Popovich et al. |
| 2013/0156265 A1 | 6/2013 | Hennessy |
| 2013/0169701 A1 | 7/2013 | Whitehead et al. |

(56) References Cited

U.S. PATENT DOCUMENTS

| | | |
|---|---|---|
| 2013/0230136 A1 | 9/2013 | Sakaguchi et al. |
| 2013/0235561 A1 | 9/2013 | Etienne et al. |
| 2013/0294684 A1 | 11/2013 | Lipton et al. |
| 2013/0307946 A1 | 11/2013 | Robinson et al. |
| 2013/0308339 A1 | 11/2013 | Woodgate et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0016354 A1 | 1/2014 | Lee et al. |
| 2014/0022619 A1 | 1/2014 | Woodgate et al. |
| 2014/0036361 A1 | 2/2014 | Woodgate et al. |
| 2014/0041205 A1 | 2/2014 | Robinson et al. |
| 2014/0043323 A1 | 2/2014 | Sumi |
| 2014/0098558 A1 | 4/2014 | Vasylyev |
| 2014/0126238 A1 | 5/2014 | Kao et al. |
| 2014/0240344 A1 | 8/2014 | Tomono et al. |
| 2014/0240828 A1 | 8/2014 | Robinson et al. |
| 2014/0289835 A1 | 9/2014 | Varshavsky et al. |
| 2014/0340728 A1 | 11/2014 | Taheri |
| 2014/0368602 A1 | 12/2014 | Woodgate et al. |
| 2015/0116212 A1 | 4/2015 | Freed et al. |
| 2015/0268479 A1 | 9/2015 | Woodgate et al. |
| 2015/0334365 A1 | 11/2015 | Tsubaki et al. |
| 2015/0339512 A1 | 11/2015 | Son et al. |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1678943 A | 10/2005 |
| CN | 1696788 A | 11/2005 |
| CN | 1823292 A | 8/2006 |
| CN | 1826553 A | 8/2006 |
| CN | 1866112 A | 11/2006 |
| CN | 1910399 A | 2/2007 |
| CN | 2872404 Y | 2/2007 |
| CN | 1307481 | 3/2007 |
| CN | 101029975 A | 9/2007 |
| CN | 101049028 A | 10/2007 |
| CN | 200983052 | 11/2007 |
| CN | 101114080 A | 1/2008 |
| CN | 101142823 A | 3/2008 |
| CN | 101266338 A | 9/2008 |
| CN | 100449353 | 1/2009 |
| CN | 101364004 A | 2/2009 |
| CN | 101598863 B | 12/2009 |
| CN | 100591141 | 2/2010 |
| CN | 101660689 A | 3/2010 |
| CN | 102147079 A | 8/2011 |
| CN | 202486493 U | 10/2012 |
| EP | 0653891 A1 | 5/1995 |
| EP | 0721131 A2 | 7/1996 |
| EP | 0830984 A2 | 3/1998 |
| EP | 0833183 A1 | 4/1998 |
| EP | 0939273 | 1/1999 |
| EP | 0656555 B1 | 3/2003 |
| EP | 1394593 A1 | 3/2004 |
| EP | 0860729 B1 | 7/2006 |
| EP | 1736702 A1 | 12/2006 |
| EP | 2003394 | 12/2008 |
| EP | 2003394 A2 | 12/2008 |
| EP | 2219067 A1 | 8/2010 |
| EP | 2451180 A2 | 5/2012 |
| EP | 1634119 B1 | 8/2012 |
| GB | 2405542 | 2/2005 |
| JP | H07270792 | 10/1995 |
| JP | H108211334 | 8/1996 |
| JP | 08-237691 A | 9/1996 |
| JP | 08254617 A | 10/1996 |
| JP | 08340556 A | 12/1996 |
| JP | H108070475 | 12/1996 |
| JP | H1042315 A | 2/1998 |
| JP | H10142556 A | 5/1998 |
| JP | H11242908 A | 9/1999 |
| JP | 2000-48618 A | 2/2000 |
| JP | 2000048618 A | 2/2000 |
| JP | 2000069504 A | 3/2000 |
| JP | 2000131683 A | 5/2000 |
| JP | 2000-200049 A | 7/2000 |
| JP | 2001093321 A | 4/2001 |
| JP | 2001281456 | 10/2001 |
| JP | 2002049004 A | 2/2002 |
| JP | 2003-215705 A | 7/2003 |
| JP | 2004112814 A | 4/2004 |
| JP | 2004265813 A | 9/2004 |
| JP | 2004319364 A | 11/2004 |
| JP | 2005116266 | 4/2005 |
| JP | 2005135844 A | 5/2005 |
| JP | 2005181914 A | 7/2005 |
| JP | 2005183030 | 7/2005 |
| JP | 2005203182 A | 7/2005 |
| JP | 2005-259361 A | 9/2005 |
| JP | 2006004877 | 1/2006 |
| JP | 2006010935 A | 1/2006 |
| JP | 2006031941 A | 2/2006 |
| JP | 2007094035 A | 4/2007 |
| JP | 3968742 B2 | 8/2007 |
| JP | 2007286652 A | 11/2007 |
| JP | 2008204874 A | 9/2008 |
| JP | 2010160527 A | 7/2010 |
| JP | 2011192468 A | 9/2011 |
| JP | 20110216281 A | 10/2011 |
| JP | 2012060607 A | 3/2012 |
| JP | 2013015619 A | 1/2013 |
| JP | 2013502693 | 1/2013 |
| JP | 2013540083 | 10/2013 |
| KR | 1020030064258 | 7/2003 |
| KR | 10-0932304 B1 | 12/2009 |
| KR | 1020110006773 A | 1/2011 |
| KR | 1020110017918 A | 2/2011 |
| KR | 1020110067534 A | 6/2011 |
| KR | 10-2012-004989 A | 5/2012 |
| KR | 1020120048301 A | 5/2012 |
| KR | 20130002646 A | 1/2013 |
| KR | 20140139730 | 12/2014 |
| TW | 200528780 A | 9/2005 |
| WO | 9406249 B1 | 4/1994 |
| WO | 9520811 A1 | 8/1995 |
| WO | 9527915 A1 | 10/1995 |
| WO | 9821620 A1 | 5/1998 |
| WO | 9911074 A1 | 3/1999 |
| WO | 0127528 A1 | 4/2001 |
| WO | 01-61241 A1 | 8/2001 |
| WO | 0161241 A1 | 8/2001 |
| WO | 0179923 A1 | 10/2001 |
| WO | 2008038539 A1 | 4/2008 |
| WO | 2008045681 A1 | 4/2008 |
| WO | 2009098809 A1 | 8/2009 |
| WO | 2010021926 A2 | 2/2010 |
| WO | 2011020962 A1 | 2/2011 |
| WO | 2011068907 A1 | 6/2011 |
| WO | 2011149739 A2 | 12/2011 |
| WO | 2012158574 A1 | 11/2012 |
| WO | 2014130860 A1 | 8/2014 |

OTHER PUBLICATIONS

International search report and written opinion of international searching authority for co-pending PCT application No. PCT/US2013/041192 mailed Aug. 28, 2013.

International search report and written opinion of international searching authority for co-pending PCT application No. PCT/US2013/041619 mailed Aug. 27, 2013.

International search report and written opinion of international searching authority for co-pending PCT application No. PCT/US2013/041655 mailed Aug. 27, 2013.

International search report and written opinion of international searching authority for co-pending PCT application No. PCT/US2013/041703 mailed Aug. 27, 2013.

(56) References Cited

OTHER PUBLICATIONS

International search report and written opinion of international searching authority for co-pending PCT application No. PCT/US2013/041548 mailed Aug. 27, 2013.
International search report and written opinion of international searching authority for co-pending PCT application No. PCT/US2013/041683 mailed Aug. 27, 2013.
International search report and written opinion of international searching authority for co-pending PCT application No. PCT/US2013/041228 mailed Aug. 23, 2013.
International search report and written opinion of international searching authority for co-pending PCT application No. PCT/US2013/041235 mailed Aug. 23, 2013.
International search report and written opinion of international searching authority for co-pending PCT application No. PCT/US2013/041697 mailed Aug. 23, 2013.
International search report and written opinion of international searching authority for PCT application PCT/US2013/063133 mailed Jan. 20, 2014.
International search report and written opinion of international searching authority for PCT application PCT/US2013/063125 mailed Jan. 20, 2014.
International search report and written opinion of international searching authority for PCT application PCT/US2013/077288 mailed Apr. 18, 2014.
International search report and written opinion of international searching authority for PCT application PCT/US2014/017779 mailed May 28, 2014.
Tabiryan et al., "The Promise of Diffractive Waveplates," Optics and Photonics News, vol. 21, Issue 3, pp. 40-45 (Mar. 2010).
International search report and written opinion of international searching authority in PCT/US2012/042279 dated Feb. 26, 2013.
International search report and written opinion of international searching authority in PCT/US2012/037677 dated Jun. 29, 2012.
International search report and written opinion of international searching authority in PCT/US2011/061511 dated Jun. 29, 2012.
Kalantar, et al. "Backlight Unit With Double Surface Light Emission," J. Soc. Inf. Display, vol. 12, Issue 4, pp. 379-387 (Dec. 2004).
International search report and written opinion of the international searching authority from PCT/US12/052189 dated Jan. 29, 2013.
International Preliminary Report on Patentability in PCT/US2011/061511 dated May 21, 2013.
Travis, et al. "Backlight for view-sequential autostereo 3D".
3M™ ePrivacy Filter software professional version; http://www.cdw.com/shop/products/3M-ePrivacy-Filter-software-professional-version/3239412aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007—2016.
AU-2011329639 Australia Patent Examination Report No. 1 dated Mar. 6, 2014.
AU-2013262869 Australian Office Action of Australian Patent Office dated Feb. 22, 2016.
AU-2015258258 Australian Office Action of Australian Patent Office dated Jun. 9, 2016.
Bahadur, "Liquid crystals applications and uses," World Scientific, vol. 1, pp. 178 (1990).
CA-2817044 Canadian office action of Jul. 14, 2016.
CN-201180065590.0 Office first action dated Dec. 31, 2014.
CN-201180065590.0 Office second action dated Oct. 21, 2015.
CN-201180065590.0 Office Third action dated Jun. 6, 2016.
CN-201280034488.9 2d Office Action from the State Intellectual Property Office of P.R. China dated Mar. 22, 2016.
CN-201280034488.9 1st Office Action from the State Intellectual Property Office of P.R. China dated Jun. 11, 2015.
CN-201380026045.X Chinese First Office Action of Chinese Patent Office dated Aug. 29, 2016.
CN-201380026046.4 Chinese 1st Office Action of the State Intellectual Property Office of P.R. China dated Oct. 24, 2016.
CN-201380026047.9 Chinese 1st Office Action of the State Intellectual Property Office of P.R. dated Dec. 18, 2015.
CN-201380026047.9 Chinese 2d Office Action of the State Intellectual Property Office of P.R. dated Jul. 12, 2016.
CN-201380026050.0 Chinese 1st Office Action of the State Intellectual Property Office of P.R. dated Jun. 3, 2016.
CN-201380026058.7 Chinese 1st Office Action of the State Intellectual Property Office of P.R. China dated Nov. 2, 2016.
CN-201380026059.1 Chinese 1st Office Action of the State Intellectual Property Office of P.R. dated Apr. 25, 2016.
CN-201380026076.5 Office first action dated May 11, 2016.
CN-201380049451.8 Chinese Office Action of the State Intellectual Property Office of P.R. dated Apr. 5, 2016.
CN-201380063047.6 Chinese Office Action of the State Intellectual Property Office of P.R. China dated Oct. 9, 2016.
CN-201380063055.0 Chinese 1st Office Action of the State Intellectual Property Office of P.R. dated Jun. 23, 2016.
CN-201480023023.2 Office action dated Aug. 12, 2016.
EP-07864751.8 European Search Report dated Jun. 1, 2012.
EP-07864751.8 Supplementary European Search Report dated May 29, 2015.
EP-09817048.3 European Search Report dated Apr. 29, 2016.
EP-11842021.5 Office Action dated Dec. 17, 2014.
EP-11842021.5 Office Action dated Oct. 2, 2015.
EP-11842021.5 Office Action dated Sep. 2, 2016.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.
EP-13790195.5 European Extended Search Report of European Patent Office dated Mar. 2, 2016.
EP-13790267.2 European Extended Search Report of European Patent Office dated Feb. 25, 2016.
EP-13790274.8 European Extended Search Report of European Patent Office dated Feb. 8, 2016.
EP-13790775.4 European Extended Search Report of European Patent Office dated Oct. 9, 2015.
EP-13790775.4 Office Action dated Aug. 29, 2016.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European Extended Search Report of European Patent Office dated Oct. 14, 2015.
EP-13791437.0 European first office action dated Aug. 30, 2016.
EP-13822472.0 European Extended Search Report of European Patent Office dated Mar. 2, 2016.
EP-13843659.7 European Extended Search Report of European Patent Office dated May 10, 2016.
EP-13844510.1 European Extended Search Report of European Patent Office dated May 13, 2016.
EP-13865893.5 European Extended Search Report of European Patent Office dated Oct. 6, 2016.
EP-14754859.8 European Extended Search Report of European Patent Office dated Oct. 14, 2016.
EP-16150248.9 European Extended Search Report of European Patent Office dated Jun. 16, 2016.
Ian Sexton et al: "Stereoscopic and autostereoscopic display-systems", —IEEE Signal Processing Magazine, May 1, 1999 (May 1, 1999), pp. 85-99, XP055305471, Retrieved from the Internet: RL:http://ieeexplore.ieee.org/iel5/79/16655/00768575.pdf [retrieved on Sep. 26, 2016].
JP-2009538527 Reasons for rejection dated Jul. 17, 2012 with translation.
JP-200980150139.1 1st Office Action dated Feb. 11, 2014.
JP-200980150139.1 2d Office Action dated Apr. 5, 2015.
JP-2013540083 Notice of reasons for rejection of Jun. 30, 2015.
JP-2013540083 Notice of reasons for rejection with translation mailed Jun. 21, 2016.

(56) References Cited

OTHER PUBLICATIONS

KR-20117010839 1st Office action (translated) dated Aug. 28, 2015.
KR-20117010839 2d Office action (translated) dated Apr. 28, 2016.
KR-20137015775 Office action (translated) dated Oct. 18, 2016.
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton, "Stereographics: Developers' Handbook", Stereographic Developers Handbook, Jan. 1, 1997, KP002239311, p. 42-49.
Marjanovic, M.,"Interlace, Interleave, and Field Dominance," http://www.mir.com/DMG/interl.html, pp. 1-5 (2001).
PCT/US2007/85475 International preliminary report on patentability dated May 26, 2009.
PCT/US2007/85475 International search report and written opinion mailed Apr. 10, 2008.
PCT/US2009/060686 international preliminary report on patentability dated Apr. 19, 2011.
PCT/US2009/060686 international search report and written opinion of international searching authority dated Dec. 10, 2009.
PCT/US2013/041237 International search report and written opinion of international searching authority Mailed May 15, 2013.
PCT/US2013/049969 International search report and written opinion of international searching authority mailed Oct. 23, 2013.
PCT/US2014/042721 International search report and written opinion of international searching authority mailed Oct. 10, 2014.
PCT/US2014/057860 International Preliminary Report on Patentability dated Apr. 5, 2016.
PCT/US2014/057860 International search report and written opinion of international searching authority dated Jan. 5, 2015.
PCT/US2014/060312 International search report and written opinion of international searching authority mailed Jan. 19, 2015.
PCT/US2014/060368 International search report and written opinion of international searching authority mailed Jan. 14, 2015.
PCT/US2014/065020 International search report and written opinion of international searching authority mailed May 21, 2015.
PCT/US2015/000327 International search report and written opinion of international searching authority dated Apr. 25, 2016.
PCT/US2015/021583 International search report and written opinion of international searching authority mailed Sep. 10, 2015.
PCT/US2015/038024 International search report and written opinion of international searching authority mailed Dec. 30, 2015.
PCT/US2016/027297 International search report and written opinion of international searching authority dated Jul. 26, 2017.
3CT/US2016/027350 International search report and written opinion of the international searching authority dated Jul. 25, 2016.
3CT/US2016/034418 International search report and written opinion of the international searching authority dated Sep. 7, 2016.
Robinson et al., U.S. Appl. No. 14/751,878 entitled "Directional privacy display" filed Jun. 26, 2015.
Robinson et al., U.S. Appl. No. 15/097,750 entitled "Wide angle imaging directional backlights" filed Apr. 13, 2016.
Robinson et al., U.S. Patent Application No. 15/098,084 entitled "Wide angle imaging directional backlights" filed Apr. 13, 2016.
PCT/US2016/056410 International search report and written opinion of the international searching authority dated Jan. 25, 2017.
Robinson et al., U.S. Appl. No. 15/165,960 entitled "Wide Angle Imaging Directional Backlights" filed May 26, 2016.
Robinson et al., U.S. Appl. No. 15/290,543 entitled "Wide angle imaging directional backlights" filed Oct. 11, 2016.
Robinson, U.S. Appl. No. 13/300,293 entitled "Directional flat illuminators" filed Nov. 18, 2011.
RU-2013122560 First office action dated Jan. 1, 2014.
RU-2013122560 Second office action dated Apr. 10, 2015.
Travis, et al. "Collimated light from a waveguide for a display," Optics Express, vol. 17, No. 22, pp. 19714-19 (2009).
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
Viola and Jones, "Rapid Object Detection using a Boosted Cascade of Simple Features", CVPR 2001, pp. 1-9.
Cootes et al., "Active Shape Models—their training and application" Computer Vision and Image Understanding 61 :11:38-59 Jan. 1995.
Cootes et al., "Active Appearance Models", IEEE Trans. Pattern Analysis and Machine Intelligence, 23(6):681-685, 2001.
Dalal et al., "Histogram of Oriented Gradients for Human Detection", Computer Vision and Pattern Recognition, pp. 386-893, 2005.
Lowe, "Distinctive Image Features from Scale-Invariant Keypoints", International Journal of Computer Vision 60 (2), pp. 91-110.
Kononenko, et al., "Learning to Look Up: Realtime Monocular Gaze Correction Using Machine Learning", Computer Vision and Pattern recognition, pp. 4667-4675, 2015.
Ozuysal, et al., "Fast Keypoint Recognition in Ten Lines of Code", Computer Vision and Pattern Recognition, pp. 1-8, 2007.
Ho, "Random Decision Forests", Proceedings of the 3rd International Conference on Document Analysis and Recognition, Montreal, QC, pp. 278-282, Aug. 14-16, 1995.
Drucker, et al., "Support Vector Regression Machines", Advances in Neural Information Processing Systems 9, pp. 155-161, NIPS 1996.
Zach, et al., "A Duality Based Approach for Realtime TV-L1 Optical Flow", Pattern Recognition (Proc. DAGM), 2007, pp. 214-223.
PCT/US2016/061428 International search report and written opinion of international searching authority mailed Jan. 20, 2017.
RU-201401264 Office action dated Jan. 18, 2017.
CN-201180065590.0 Office fourth action dated Jan. 4, 2017.
CN-201380073381.X Chinese Office Action of the State Intellectual Property Office of P.R. China dated Nov. 16, 2016.
CN-201380026045.X first office action dated Aug. 29, 2016.
AU-2014218711 Examination report No. 1 dated Mar. 20, 2017.
Beato: "Understanding Comfortable stereography", Dec. 31, 2011 (Dec. 31, 2011), XP055335952, Retrieved from the Internet: URL:http://64.17.134.112/Affonso Beato/Understanding Comfortable Stereography.html [retrieved-on Jan. 17, 2017].
Braverman: "The 3D Toolbox : News", Aug. 13, 2010 (Aug. 13, 2010), XP055336081, Retrieved from the Internet: URL:http://www.dashwood3d.com/blog/the-3d-toolbox/ [retrieved on Jan. 17, 2017].
CN-201380026050.0 Chinese 2nd Office Action of the State Intellectual Property Office of P.R. dated Apr. 1, 2017.
CN-201380026059.1 Chinese 2nd Office Action of the State Intellectual Property Office of P.R. dated Feb. 22, 2017.
CN-201480023023.2 Office second action dated May 11, 2017 (translated).
EP-14813739.1 European Extended Search Report of European Patent Office dated Jan. 25, 2017.
JP-2015-512794 1st Office Action (translated) dated Feb. 14, 2017.
JP-2015-512809 1st Office Action dated Mar. 28, 2017 (translated).
JP-2015-512810 1st Office Action (translated) dated Feb. 7, 2017.
JP-2015-512879 1st Office Action (translated) dated Apr. 11, 2017.
JP-2015-512887 1st Office Action (translated) dated Feb. 7, 2017.
JP-2015-512896 1st Office Action (translated) dated Apr. 27, 2017.
JP-2015-512901 1st Office Action dated Mar. 28, 2017 (translated).
JP-2015-512905 1st Office Action (translated) dated Feb. 7, 2017.
Lipton: "Stereoscopic Composition Lenny Lipton", Feb. 15, 2009 (Feb. 15, 2009), XP055335930, Retrieved from the Internet: URL:https://lennylipton.wordpress.com/2009/15/stereoscopic-composition/ [retrieved on Jan. 17, 2017].
Lucio et al: "RGBD Camera Effects", Aug. 1, 2012 (Aug. 1, 2012), XP055335831, SIBGRAPI—Conference on Graphics, Patterns and Images Retrieved from the Internet: URL:https://www.researchgate.net/profile/Leandro Cruz/publication/233398182 RGBD Camera Effects/links/0912f50a2922010eb2000000.pdf [retrieved on Jan. 17, 2017].
PCT/US2015/054523 International search report and written opinion of international searching authority dated Mar. 18, 2016.
PCT/US2016/058695 International search report and written opinion of international searching authority dated Feb. 28, 2017.

(56) References Cited

OTHER PUBLICATIONS

PCT/US2017/012203 International search report and written opinion of international searching authority mailed Apr. 18, 2017.

* cited by examiner

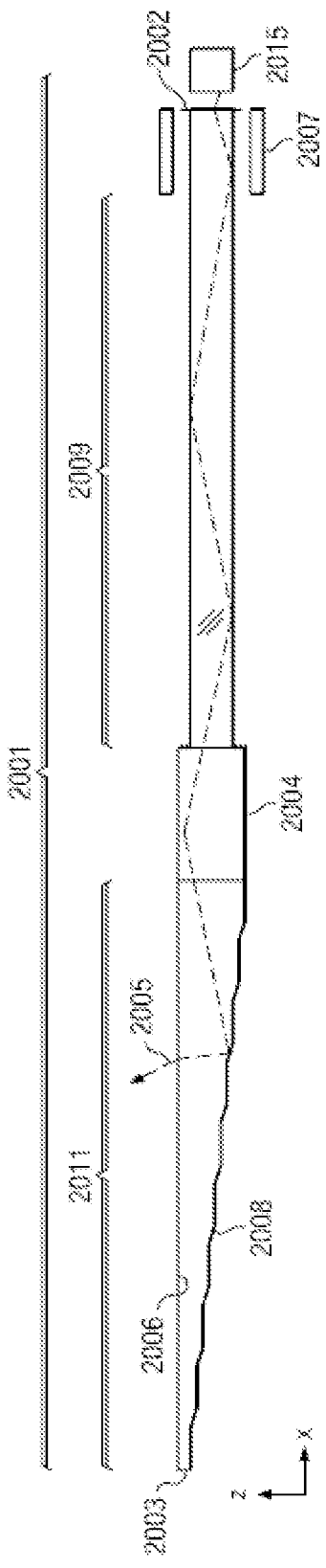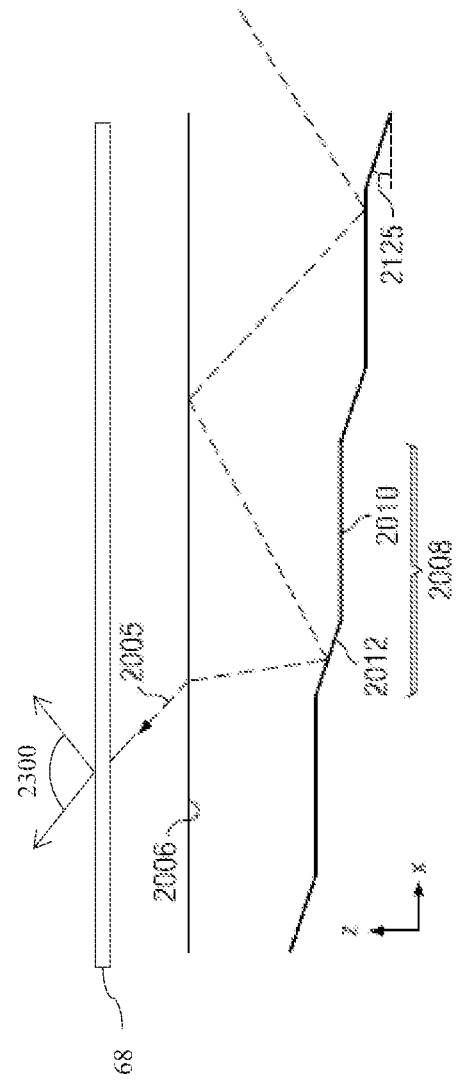

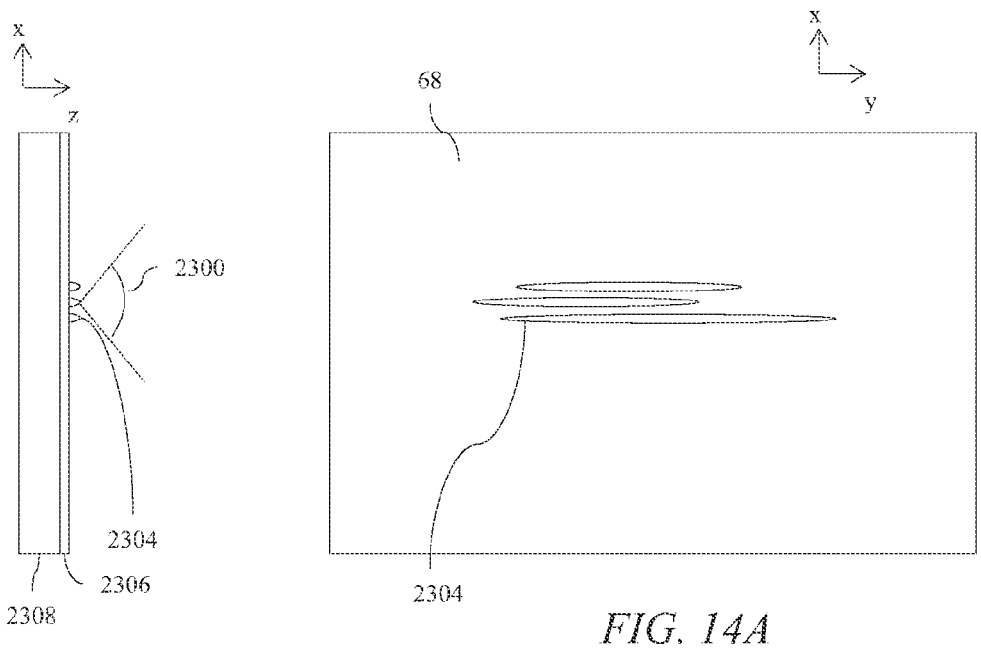
FIG. 14B
FIG. 14A
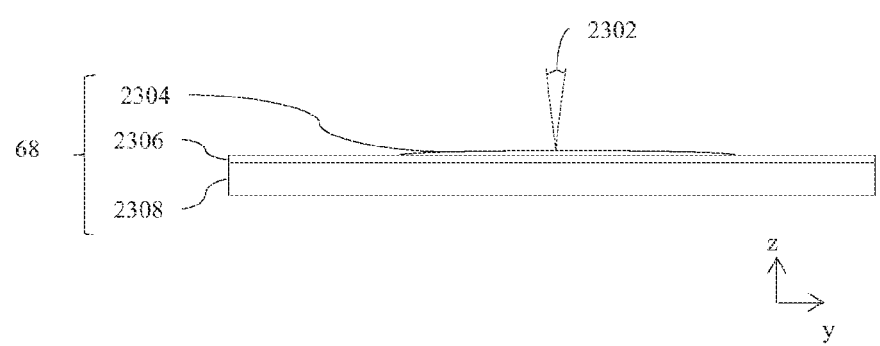
FIG. 14C

DIRECTIONAL BACKLIGHT

CROSS-REFERENCE TO RELATED APPLICATIONS

This application claims priority to U.S. Provisional Patent Application No. 61/649,124, entitled "Optical inline directional backlight apparatus and method thereof," filed May 18, 2012, which is herein incorporated by reference in its entirety.

TECHNICAL FIELD

This disclosure generally relates to illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can comprise addressing electronics in the spatial light modulator.

BRIEF SUMMARY

According to an aspect of the present invention, a directional backlight may comprise an array of light sources, a light expansion waveguide section and a light extraction waveguide section. The light expansion waveguide section may have an input end and opposed guide surfaces for guiding light along the waveguide. The array of light sources may be disposed at different input positions in a lateral direction across the input end of the light expansion waveguide section. The light extraction waveguide section may be arranged to receive light from the light expansion waveguide section and may comprise first and second, opposed guide surfaces for guiding light along the light extraction waveguide section. The first guide surface may be arranged to guide light by total internal reflection and the second guide surface may have a stepped shape comprising a plurality of facets and intermediate regions intermediate the facets, wherein the intermediate regions are arranged to direct light through the light extraction waveguide section without extracting it, and the facets face the light expansion waveguide section and oriented to reflect light guided through the light extraction waveguide section in directions allowing exit through the first guide surface into optical windows in output directions distributed in the lateral direction that are dependent on the input positions of the light sources.

Advantageously the present embodiments can achieve a directional waveguide that can achieve illumination of a spatial light modulator for directional display applications including autostereoscopic display, privacy display and high power efficiency displays. The directional output can be modified in cooperation with a control system to achieve tracking of a moving observer, and illumination of multiple observers. The directional waveguide may be arranged in a thin package, reducing bulk and cost of the display system. The directional illumination may be achieved with low cross talk and may be responsive to rapid observer motion, reducing the appearance of image flicker.

By way of comparison with arrangements wherein the light is reflected by a reflective end within the waveguide, the light expansion waveguide section is arranged separately from the light extraction waveguide section. For light passing from the light source to the facets of the second guide surface that provide extraction, the appearance of scatter artefacts due to light losses at the surface of the waveguide may be reduced. In particular, the visibility of the illumination triangle for light propagating in air from the light sources at the input may be reduced. Further, the length of the light expansion waveguide section may be different to the length of the light extraction waveguide section, which may achieve improved aberrations for a given size of extraction region. The array of light sources may be separated from the light extraction waveguide section, which may achieve improved separation of stray light from the light sources compared to the light extraction section. Further the requirement for a reflective end may be eliminated, reducing cost of manufacture.

According to a further aspect of the present disclosure, a directional backlight apparatus may include an array of light emitting elements and a waveguide for guiding light. The waveguide may include a first light guiding region which may include first and second substantially parallel planar surfaces. The waveguide may additionally include a second light guiding region which may include a first light guiding surface that may be substantially planar and a second light guiding surface, opposite the first light guiding surface. The second light guiding surface may additionally include a plurality of guiding features and a plurality of extraction features, in which the extraction features and the guiding features are connected to and alternate with one another respectively. Further, the plurality of extraction features may direct light to reflect and exit the light valve. Moreover, the extraction features may be arranged so that light from the light emitting elements may be directed by the extraction features with substantially the same directionality for extraction features across the plurality of extraction features.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in patent application Ser. No. 13/300,293, which is herein incorporated by reference, in its entirety.

However, the optical valve has an extraction efficiency that may be, at least in part, determined by the ratio of the height of the input side to the height of the reflecting side.

The present embodiments provide waveguide imaging directional backlights that comprise stepped waveguides. Light is injected into a light expansion waveguide section arranged to provide expansion of light in at least a lateral direction. The light expansion waveguide section may have substantially parallel sides for guiding light. The light is then incident on a light extraction waveguide section, wherein light extraction is advantageously achieved by facets that are inclined to intermediate regions.

Embodiments herein may provide an autostereoscopic display with large area and thin structure. Further, as will be described, the directional backlights of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display. Embodiments may achieve observer tracking and may provide multi-user autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is only provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 12 is a schematic diagram illustrating a side view of an inline directional backlight, in accordance with the present disclosure;

FIG. 13 is a schematic diagram illustrating a side view of a detail of the stepped light extraction waveguide section of an inline directional backlight, in accordance with the present disclosure;

FIGS. 14A-C are schematic diagrams illustrating front and side views of an asymmetric diffuser, in accordance with the present disclosure;

DETAILED DESCRIPTION

Figure 1A:
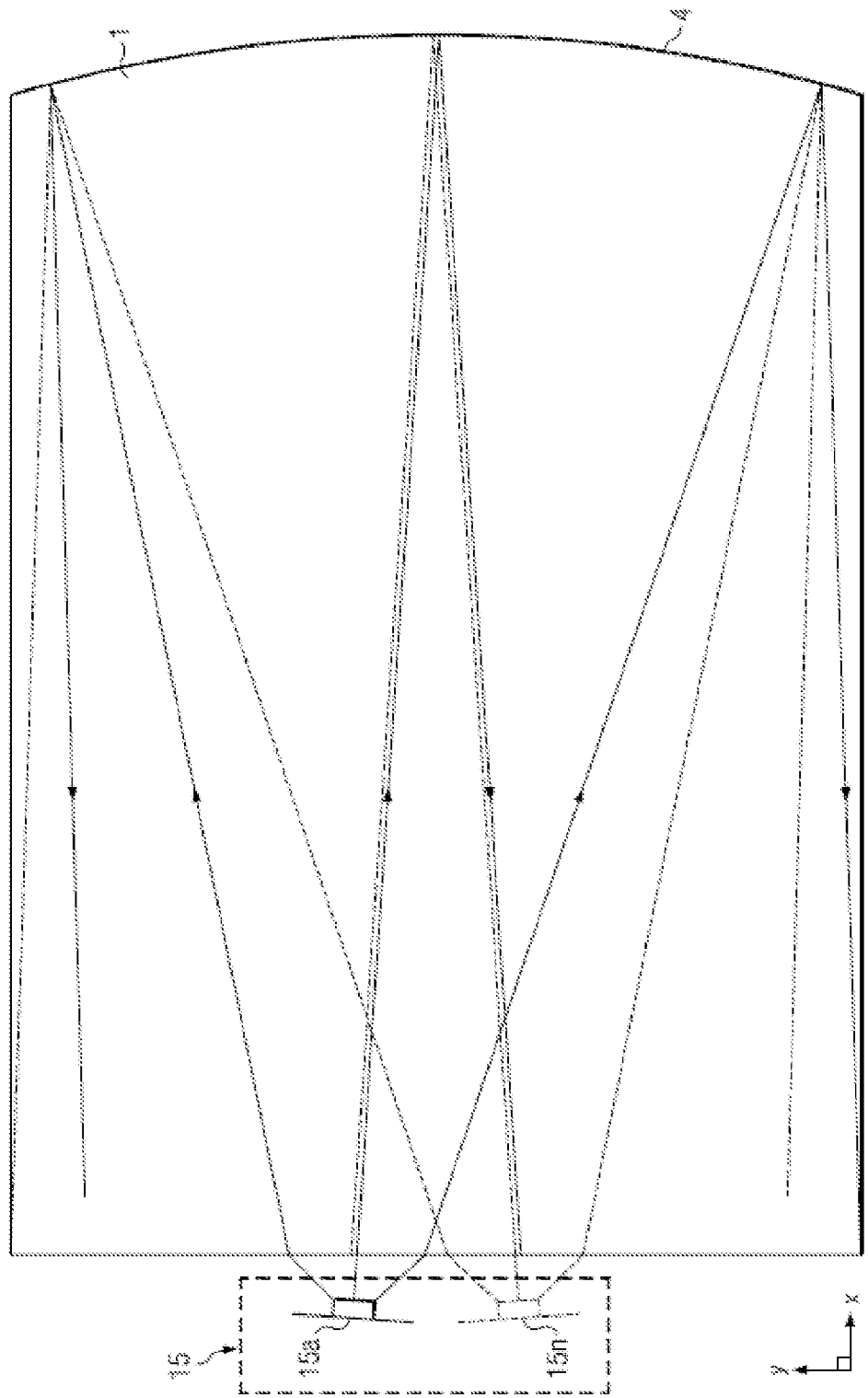
FIG. 1A is a schematic diagram illustrating a front view of light propagation in one embodiment of a directional display device, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (which is sometimes referred to as a "light valve"). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. patent application Ser. No. 13/300,293, which is herein incorporated by reference in its entirety.

A stepped waveguide is a waveguide for an imaging directional backlight comprising a waveguide for guiding light, further comprising: a first light guiding surface; and a second light guiding surface, opposite the first light guiding surface, further comprising a plurality of light guiding features interspersed with a plurality of extraction features arranged as steps.

In operation, light may propagate within an exemplary optical valve in a first direction from an input end to a reflective end and may be transmitted substantially without loss. Light may be reflected at the reflective end and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," all of which are herein incorporated by reference in their entirety.

In stepped waveguide imaging directional backlights, light may reflect back and forth between the internal faces of, for example, a stepped waveguide which may include a first guide surface and a second guide surface comprising a plurality of light extraction features and intermediate regions. As the light travels along the length of the stepped waveguide, the light may not substantially change angle of incidence with respect to the first and second guide surfaces and so may not reach the critical angle of the medium at these internal surfaces. Light extraction may be advantageously achieved by a light extraction features which may be facets of the second guide surface (the step "risers") that are inclined to the intermediate regions (the step "treads"). Note that the light extraction features may not be part of the light guiding operation of the stepped waveguide, but may be arranged to provide light extraction from the structure. By contrast, a wedge type imaging directional backlight may allow light to guide within a wedge profiled waveguide having continuous internal surfaces. Thus the stepped waveguide (optical valve) is thus not a wedge type imaging directional backlight.

Firstly, there will be described some directional backlights in which light is extracted after reflection from a reflective end of a waveguide, and directional display devices including such directional backlights.

Figure 1B:
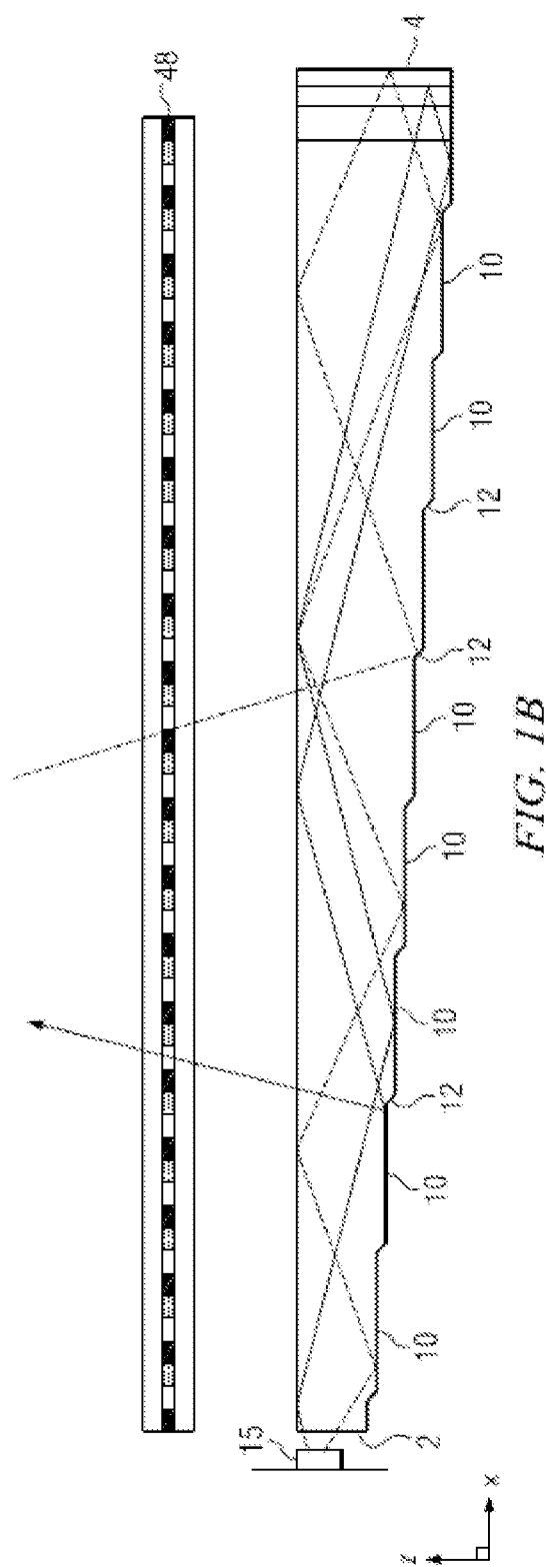
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of structure directional display device, and FIG. 1B is a schematic diagram illustrating a side view of light propagation in the directional display device of FIG. 1A.

FIG. 1A illustrates a front view in the xy plane of an optical valve, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illuminator elements 15a through 15n form light sources and may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM (spatial light modulator) 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 and a reflective end 4 that is thicker than the input end 2. The waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1 by total internal reflection. The first guide surface is planar. The second guide surface has a plurality of light extraction features 12 facing the reflective end 4 and inclined to reflect at least some of the light guided back through the waveguide 1 from the reflective end in directions that break the total internal reflection at the first guide surface and allow output through the first guide surface, for example, upwards in FIG. 1B, that is supplied to the SLM 48.

In this example, the light extraction features 12 are reflective facets, although other reflective features could be used. In this example, the second guide surface has a stepped shape including the light extraction features 12 and intermediate regions intermediate the light extraction features 12. The light extraction features 12 do not guide light through the waveguide 1, whereas the intermediate regions of the second guide surface intermediate the light extraction features 12 guide light without extracting it. Those intermediate regions of the second guide surface are planar and may extend parallel to the first guide surface, or at a relatively low inclination. The light extraction features 12 are inclined relative to those intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window.

In the present disclosure an optical window may correspond to the image of a single light source in the window plane, being a nominal plane in which optical windows form across the entirety of the display device. Alternatively, an optical window may correspond to the image of a groups of light sources that are driven together. Advantageously, such groups of light sources may increase uniformity of the optical windows of the array 121.

By way of comparison, a viewing window is a region in the window plane wherein light is provided comprising image data of substantially the same image from across the display area. Thus a viewing window may be formed from a single optical window or from plural optical windows, under the control of the control system.

The SLM 48 extends across the waveguide is transmissive and modulates the light passing therethrough. Although the SLM 48 may be a liquid crystal display (LCD) but this is merely by way of example, and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of input end 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the reflective end 4 that is curved to have positive optical power. While propagating, the light may spread out to a set of angles in the xz plane up to, but not exceeding the critical angle of the guide material. The extraction features 12 that link the guiding features 10 of the second guide surface 8 of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the reflective end 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input end 2 then enables light to exit from the entire first light directing side 6 and propagate at different external angles, as illustrated in FIG. 1A.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the centre of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the centre of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically comprise a spherical profile to optimize performance for on-axis and off-axis viewing positions. Other profiles may be used.

Figure 2A:
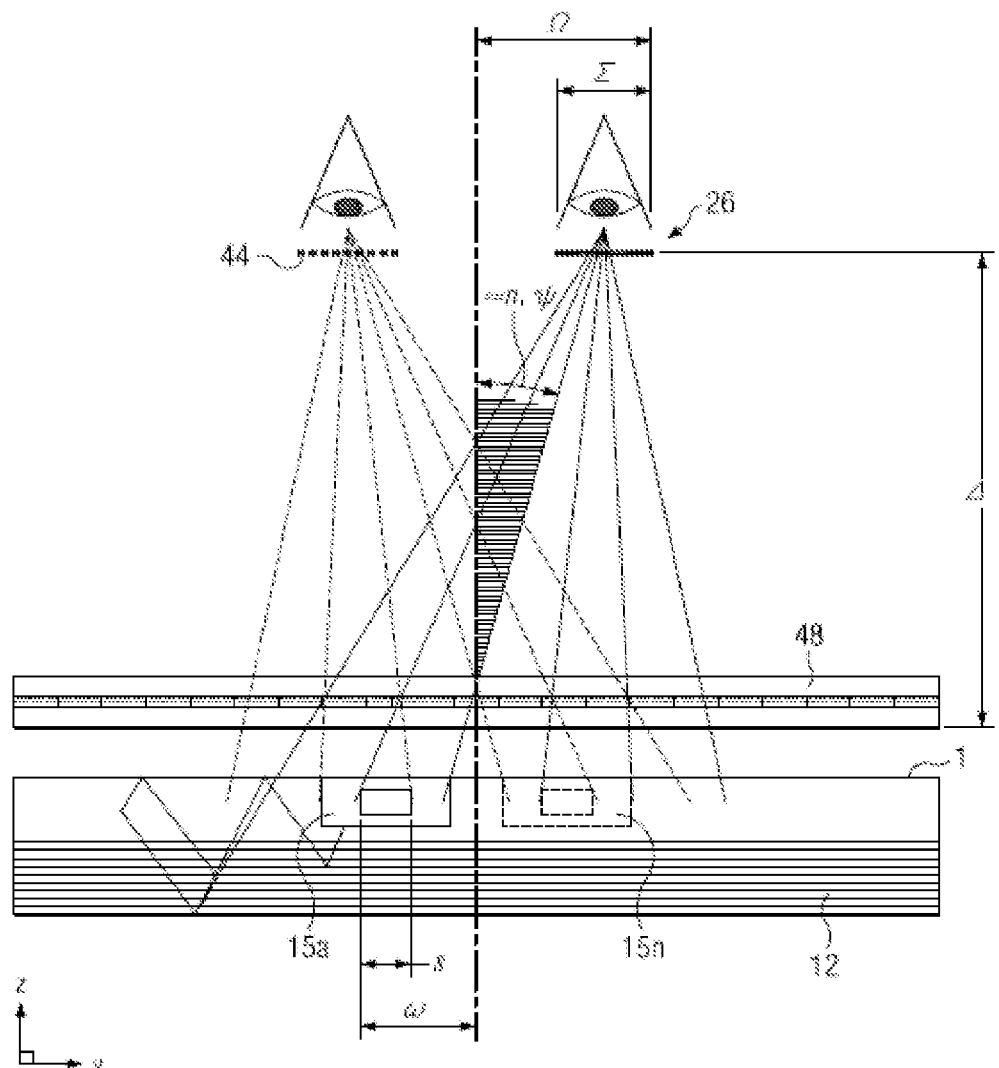
FIG. 2A is a schematic diagram illustrating in a top view of light propagation in another embodiment of a directional display device, in accordance with the present disclosure.
Figure 2B:
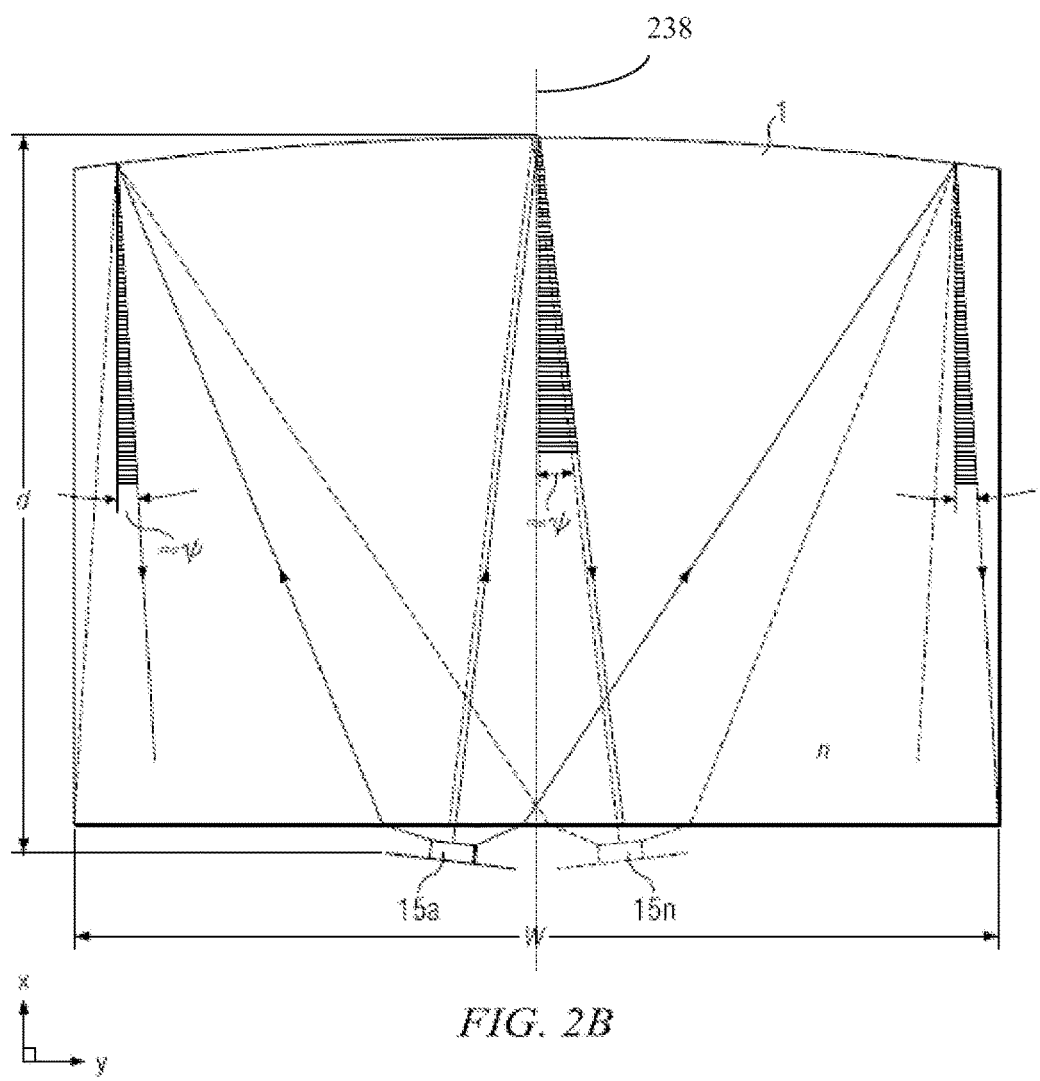
FIG. 2B is a schematic diagram illustrating light propagation in a front view of the directional display device of FIG. 2A, in accordance with the present disclosure.
Figure 2C:
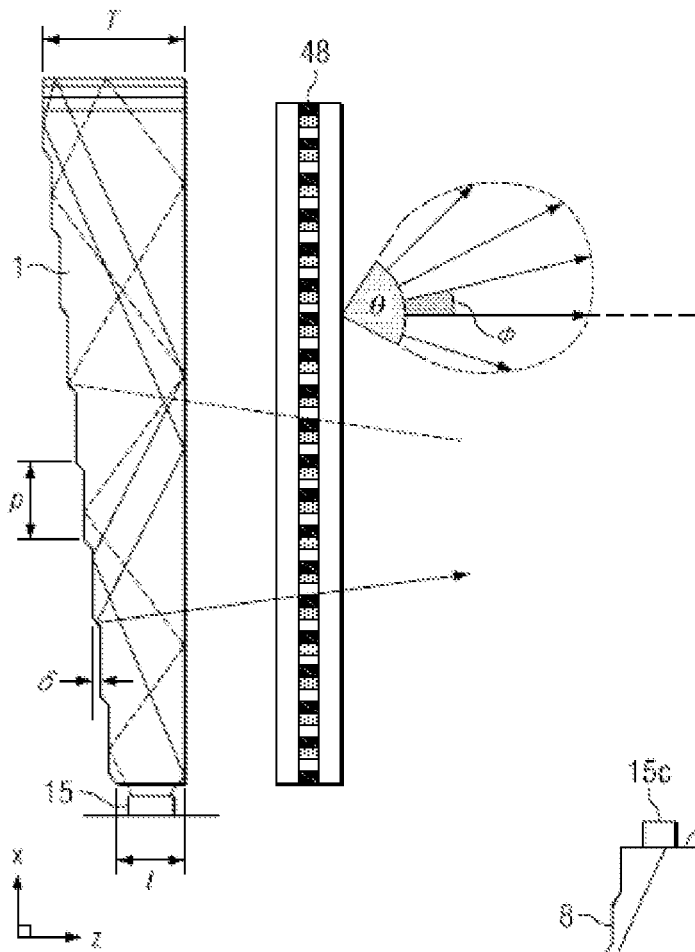
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

Figure 3:
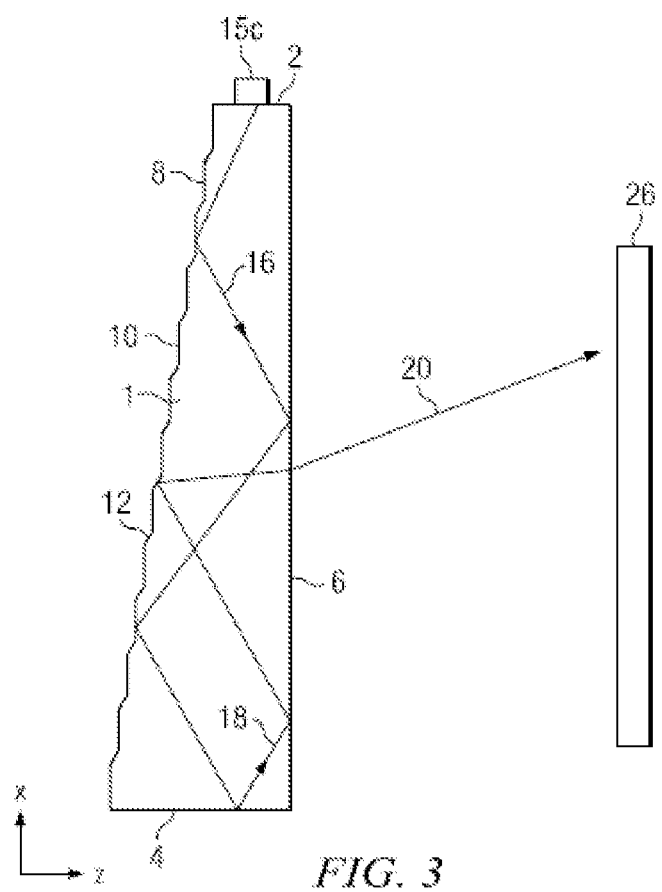
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input end 2, a reflective end 4, a first guide surface 6 which may be substantially planar, and a second guide surface 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first guide surface 6 and total internal reflection by the guiding feature 10 of the second guide surface 8, to the reflective end 4, which may be a mirrored surface. Although reflective end 4 may be a mirrored surface and may reflect light, it may in some embodiments also be possible for light to pass through reflective end 4.

Continuing the discussion of FIG. 3, light ray 18 reflected by the reflective end 4 may be further guided in the stepped waveguide 1 by total internal reflection at the reflective end 4 and may be reflected by extraction features 12. Light rays 18 that are incident on extraction features 12 may be substantially deflected away from guiding modes of the stepped waveguide 1 and may be directed, as shown by ray 20, through the first guide surface 6 to an optical pupil that may form a viewing window 26 of an autostereoscopic display. The width of the viewing window 26 may be determined by at least the size of the illuminator, output design distance and optical power in the reflective end 4 and extraction features 12. The height of the viewing window may be primarily determined by the reflection cone angle of the extraction features 12 and the illumination cone angle input at the input end 2. Thus each viewing window 26 represents a range of separate output directions with respect to the surface normal direction of the SLM 48 that intersect with a plane at the nominal viewing distance.

Figure 4A:
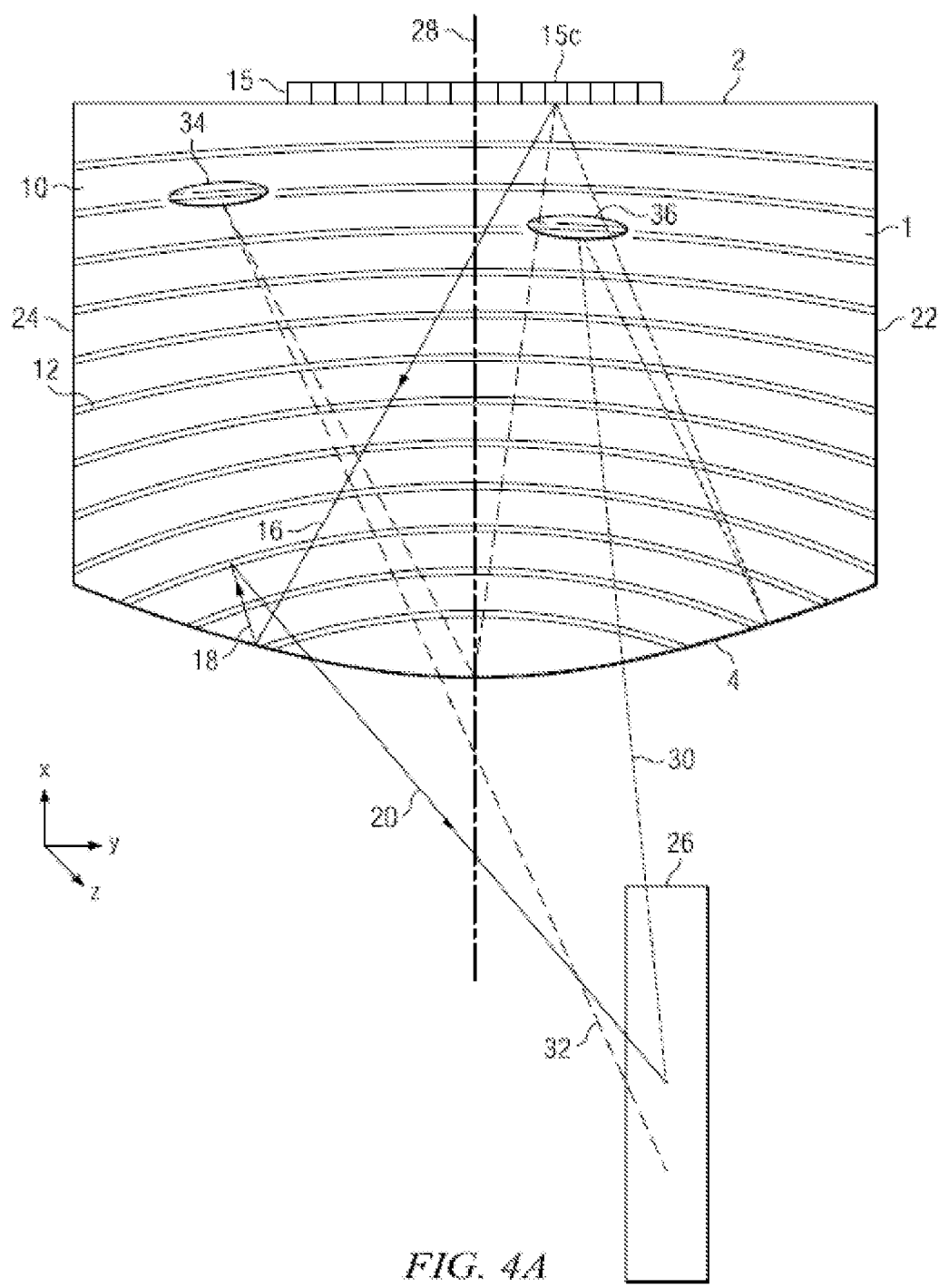
FIG. 4A is schematic diagram illustrating in a front view, generation of a viewing window in a directional display device and including curved light extraction features, in accordance with the present disclosure.

FIG. 4A is a schematic diagram illustrating in front view a directional display device which may be illuminated by a first illuminator element and including curved light extraction features. In FIG. 4A, the directional backlight may include the stepped waveguide 1 and the light source illuminator array 15. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the optical valve may be transparent, mirrored, or blackened surfaces. Continuing the discussion of FIG. 4A, light extraction features 12 may be elongate, and the orientation of light extraction features 12 in a first region 34 of the second guide surface 8 (that is shown in FIG. 3, but not shown in FIG. 4A) may be different to the orientation of light extraction features 12 in a second region 36 of the second guide surface 8.

Figure 4B:
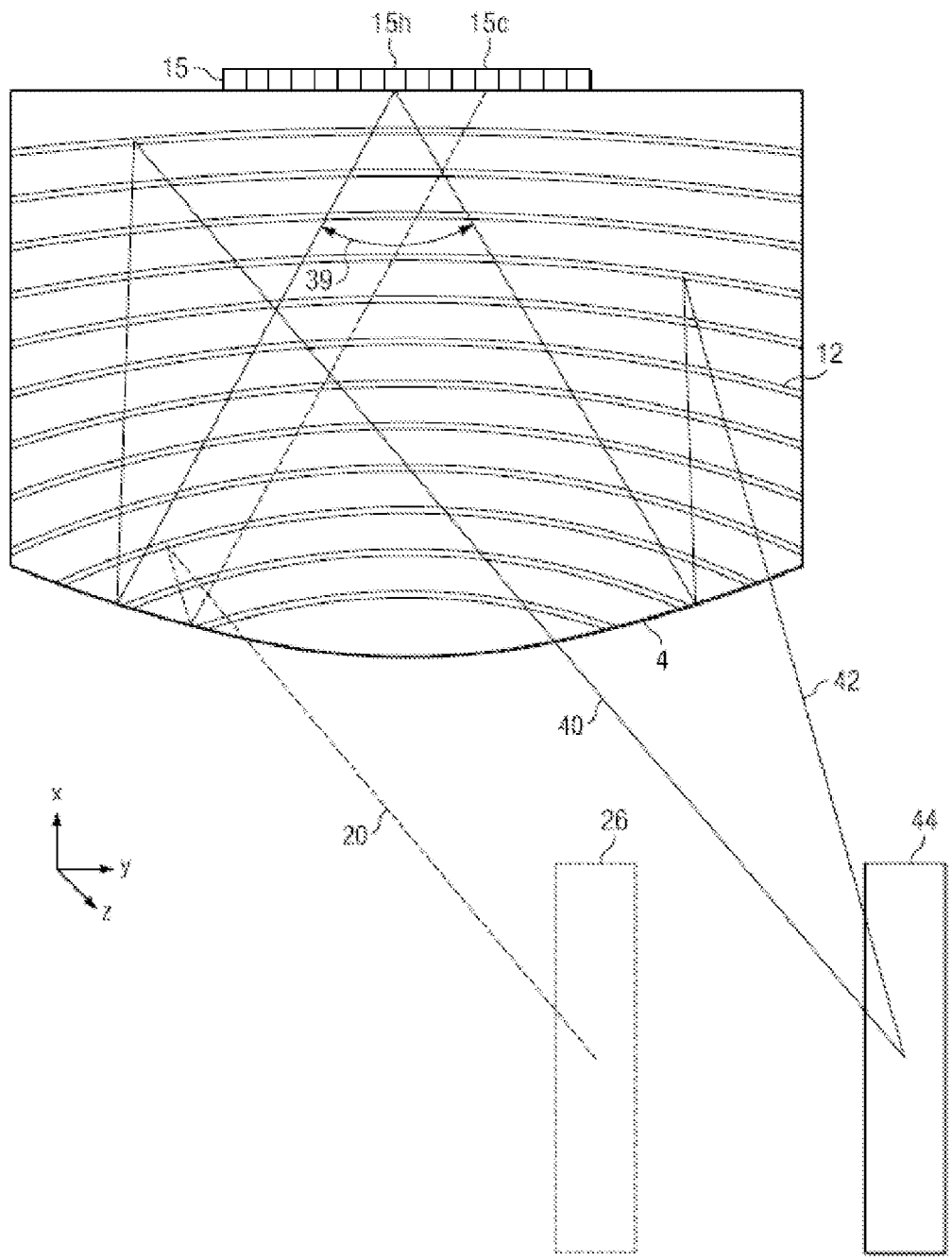
FIG. 4B is a schematic diagram illustrating in a front view, generation of a first and a second viewing window in a directional display device and including curved light extraction features, in accordance with the present disclosure.

FIG. 4B is a schematic diagram illustrating in front view a directional display device which may illuminated by a second illuminator element. Further, FIG. 4B shows the light rays 40, 42 from a second illuminator element 15h of the illuminator array 15. The curvature of the reflective surface on the reflective end 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective end 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
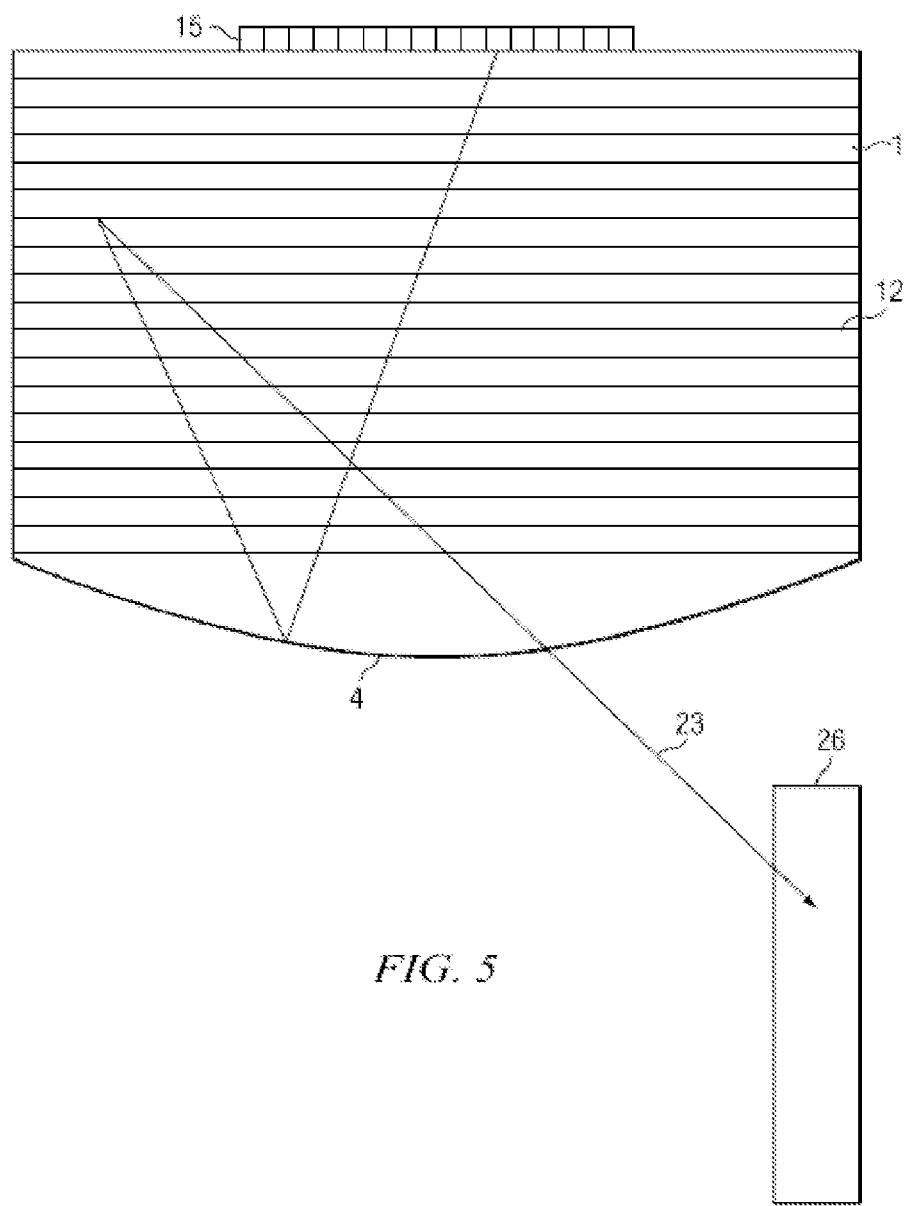
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device including a waveguide 1 having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
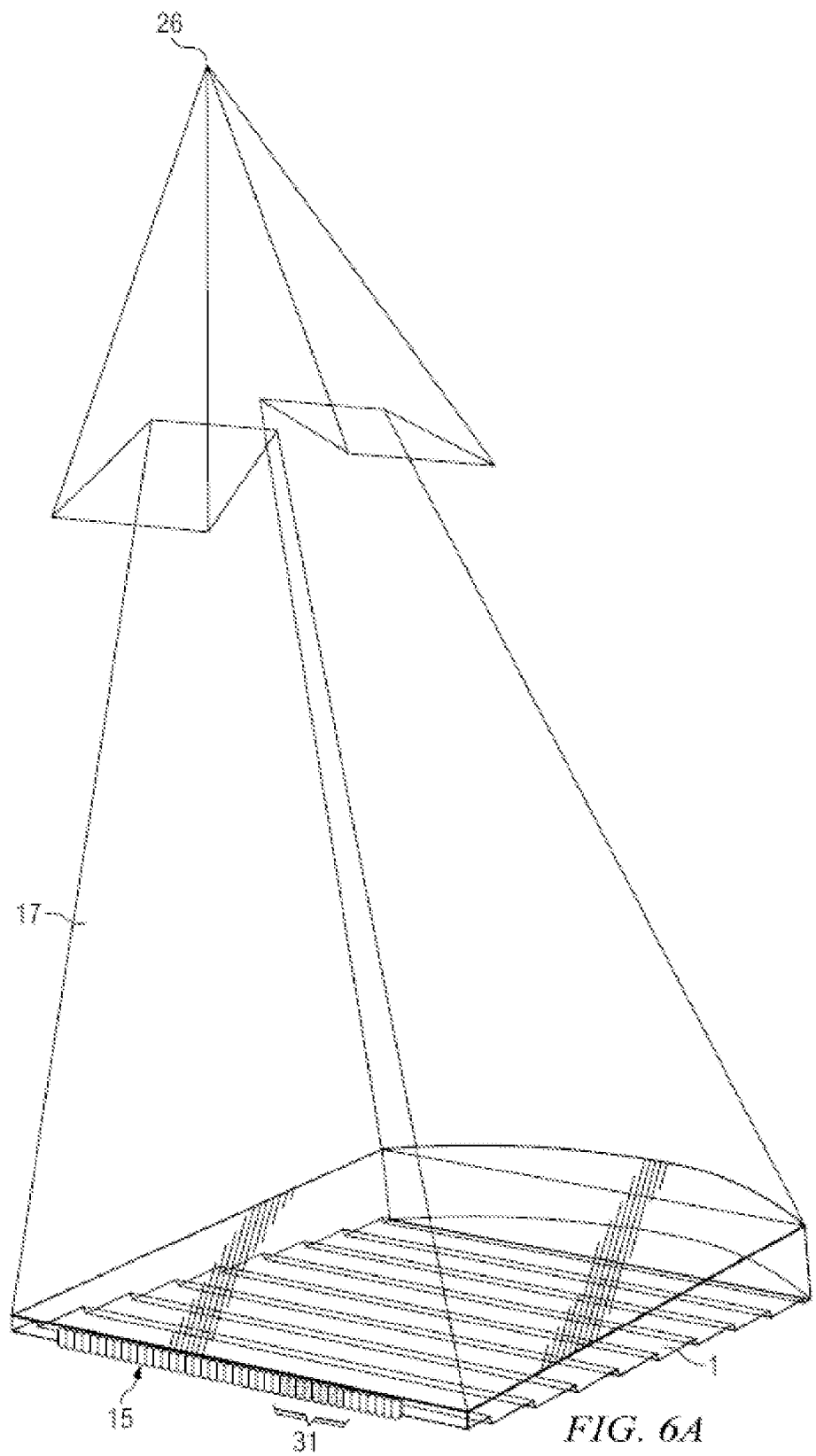
FIG. 6A is a schematic diagram illustrating one embodiment of the generation of a first viewing window in a time multiplexed imaging directional display device in a first time slot, in accordance with the present disclosure.
Figure 6B:
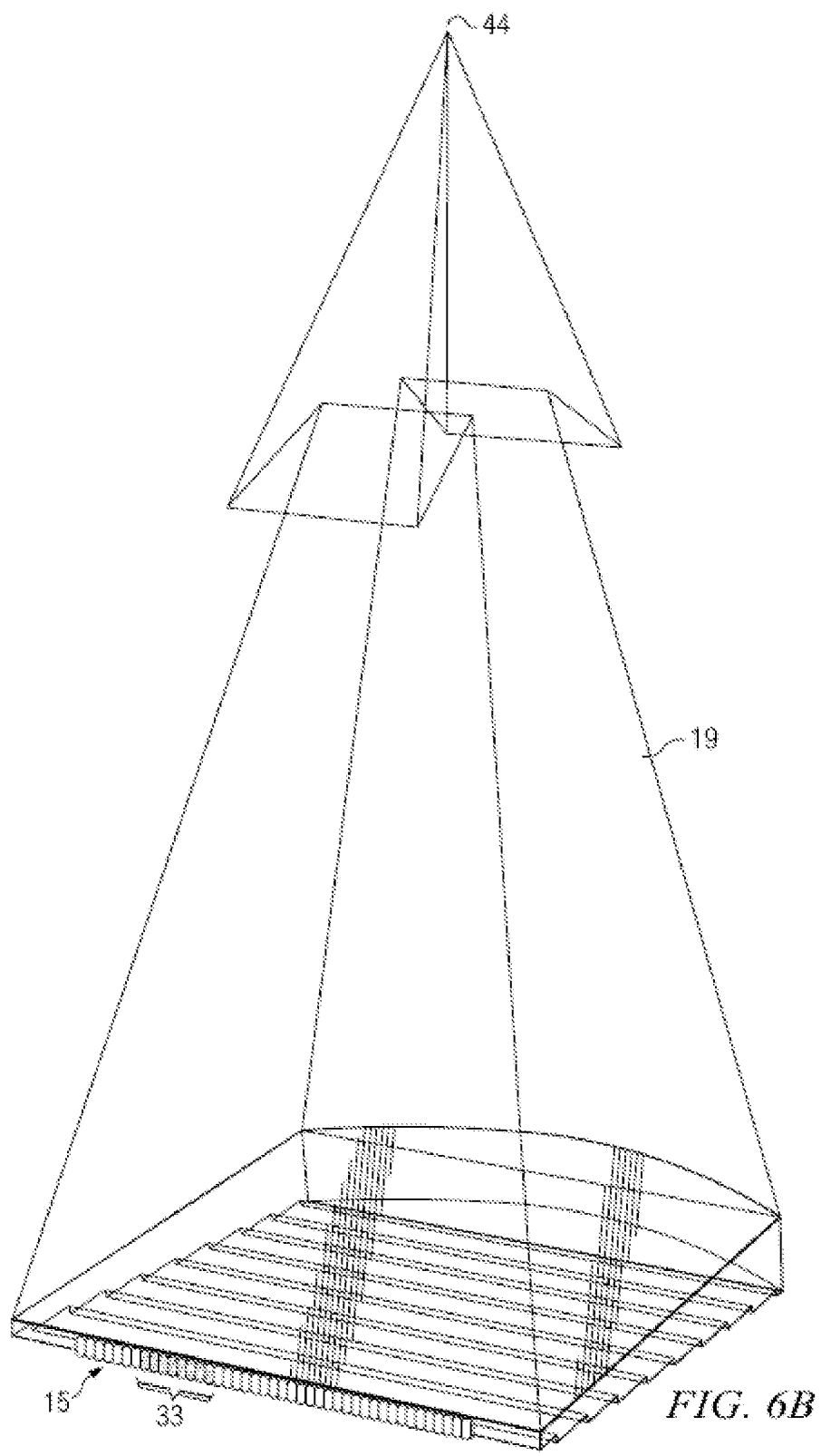
FIG. 6B is a schematic diagram illustrating another embodiment of the generation of a second viewing window in a time multiplexed directional display device in a second time slot, in accordance with the present disclosure.
Figure 6C:
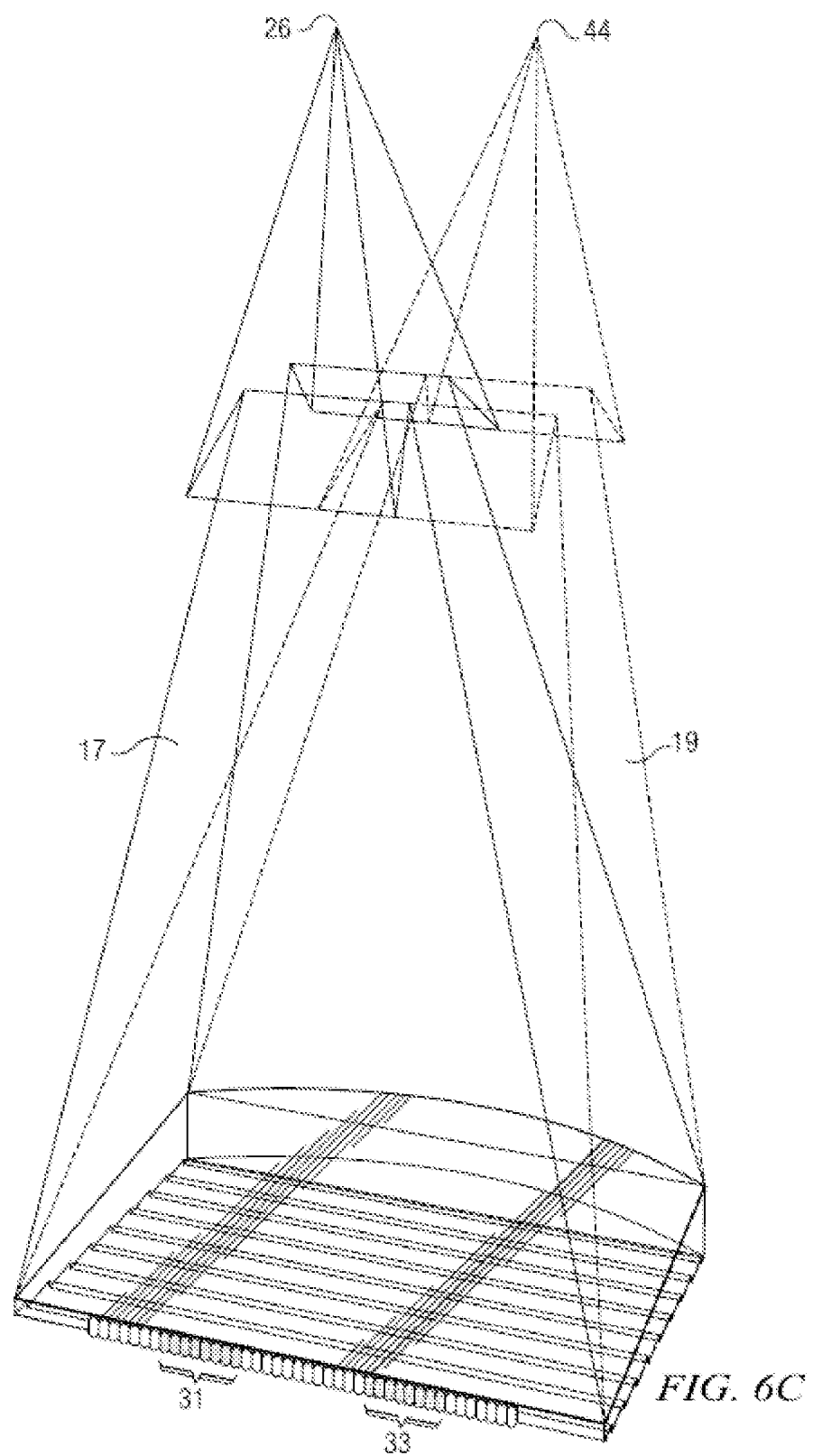
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional display device in a second time slot, and FIG. 6C is a schematic diagram illustrating another embodiment of the generation of a first and a second viewing window in a time multiplexed imaging directional display device. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the directional backlights and directional display devices described herein. Note that illuminator element groups 31, 33 each include one or more illumination elements from illumination elements 15a to 15n, where n is an integer greater than one.

Figure 7:
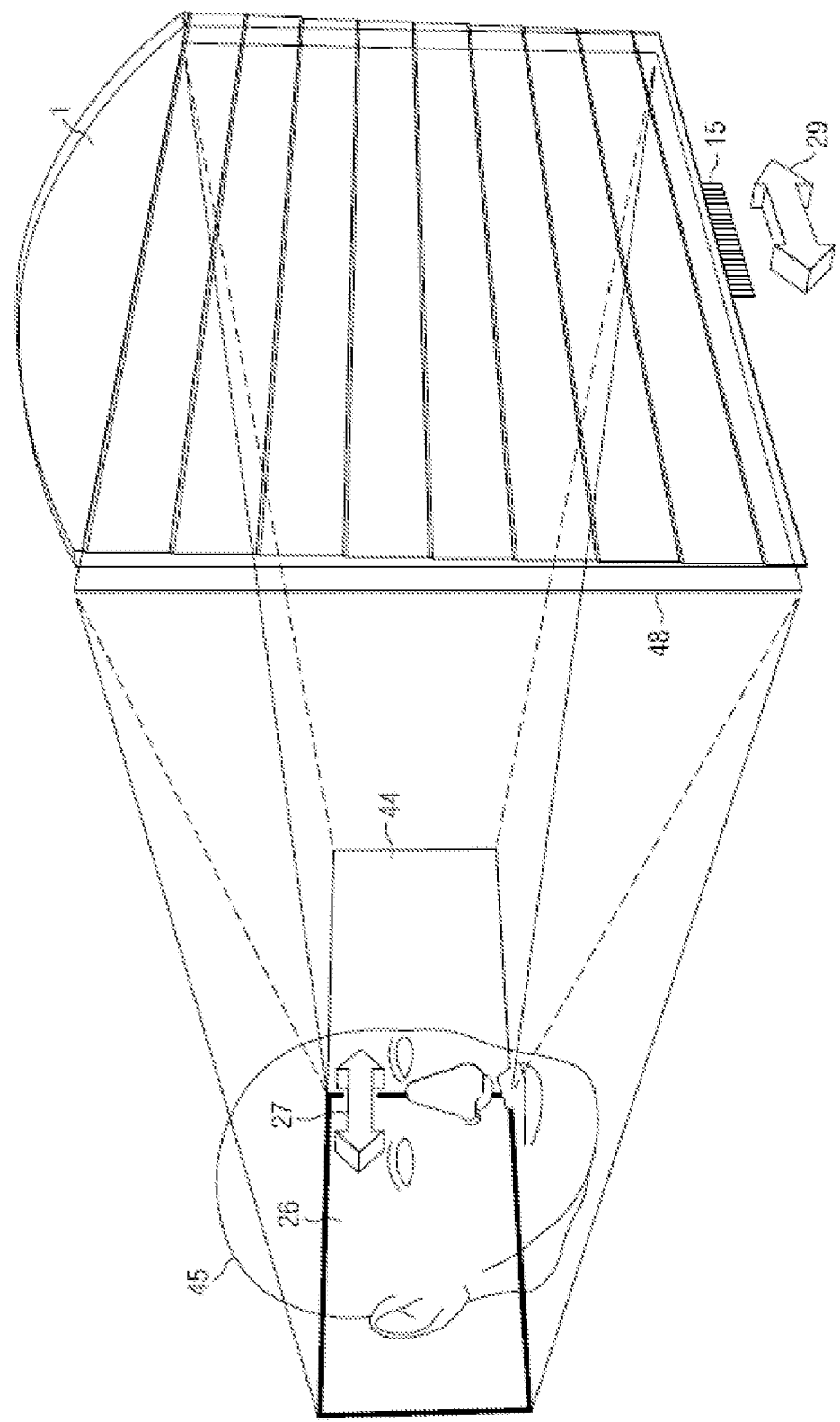
FIG. 7 is a schematic diagram illustrating an observer tracking autostereoscopic display apparatus including a time multiplexed directional display device, in accordance with the present disclosure.

FIG. 7 is a schematic diagram illustrating one embodiment of an observer tracking autostereoscopic display apparatus including a time multiplexed directional display device. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the directional backlights and directional display devices described herein.

Figure 8:
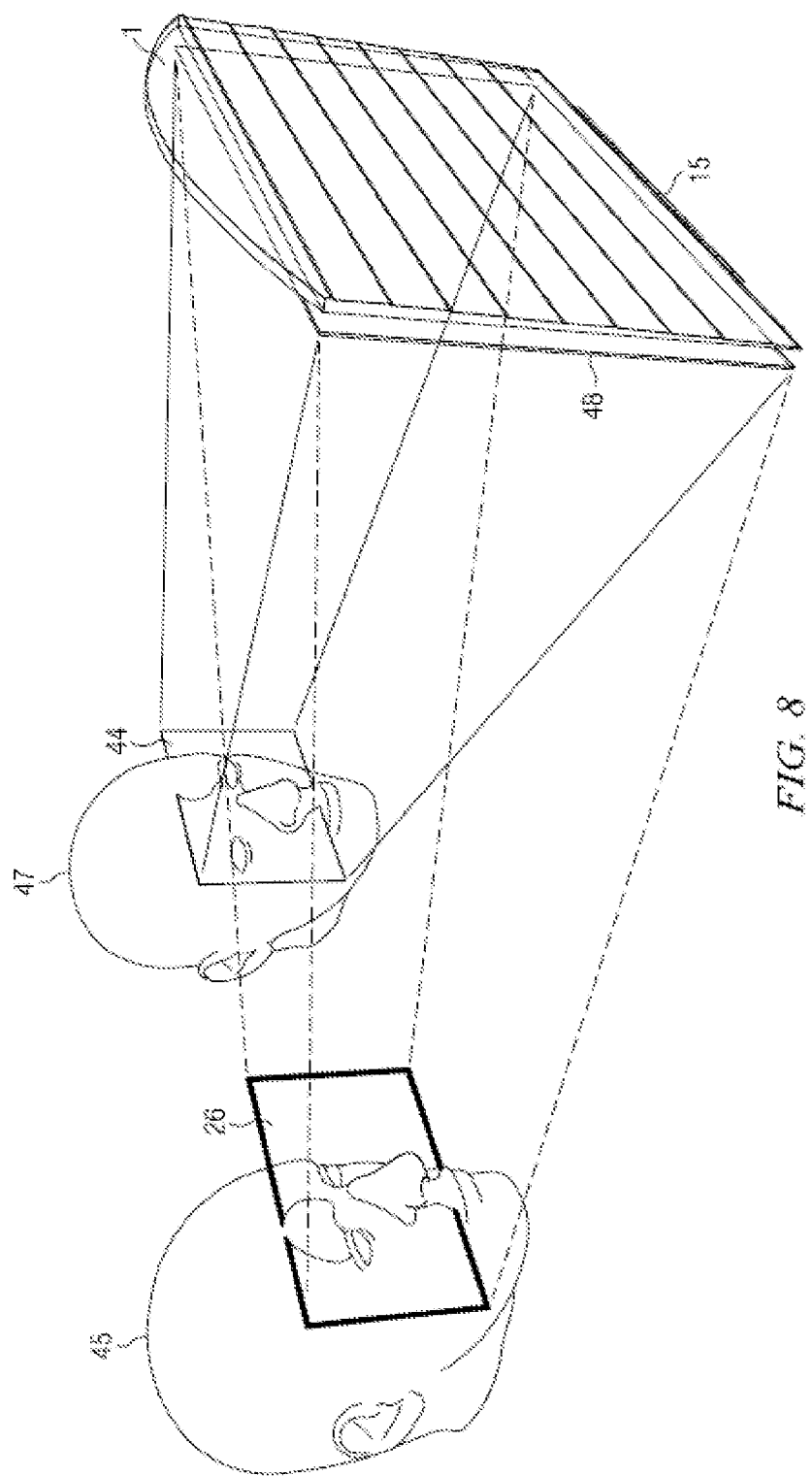
FIG. 8 is a schematic diagram illustrating a multi-viewer directional display device, in accordance with the present disclosure.

FIG. 8 is a schematic diagram illustrating one embodiment of a multi-viewer directional display device which includes a time multiplexed directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
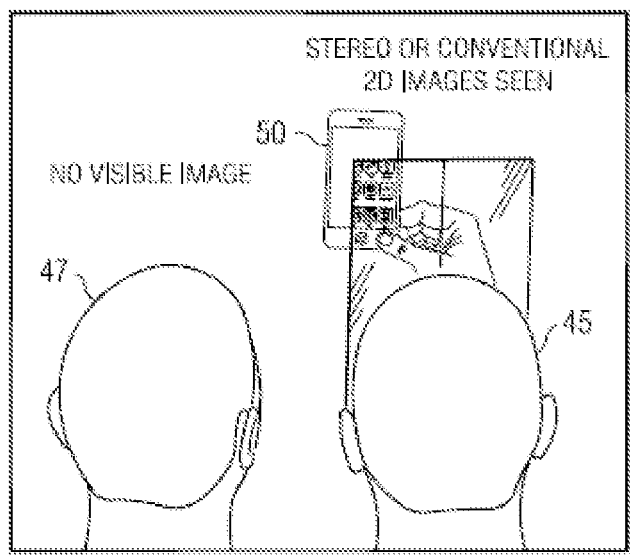
FIG. 9 is a schematic diagram illustrating a privacy directional display device, in accordance with the present disclosure.

FIG. 9 is a schematic diagram illustrating a privacy directional display device which includes a directional backlight. 2D image display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
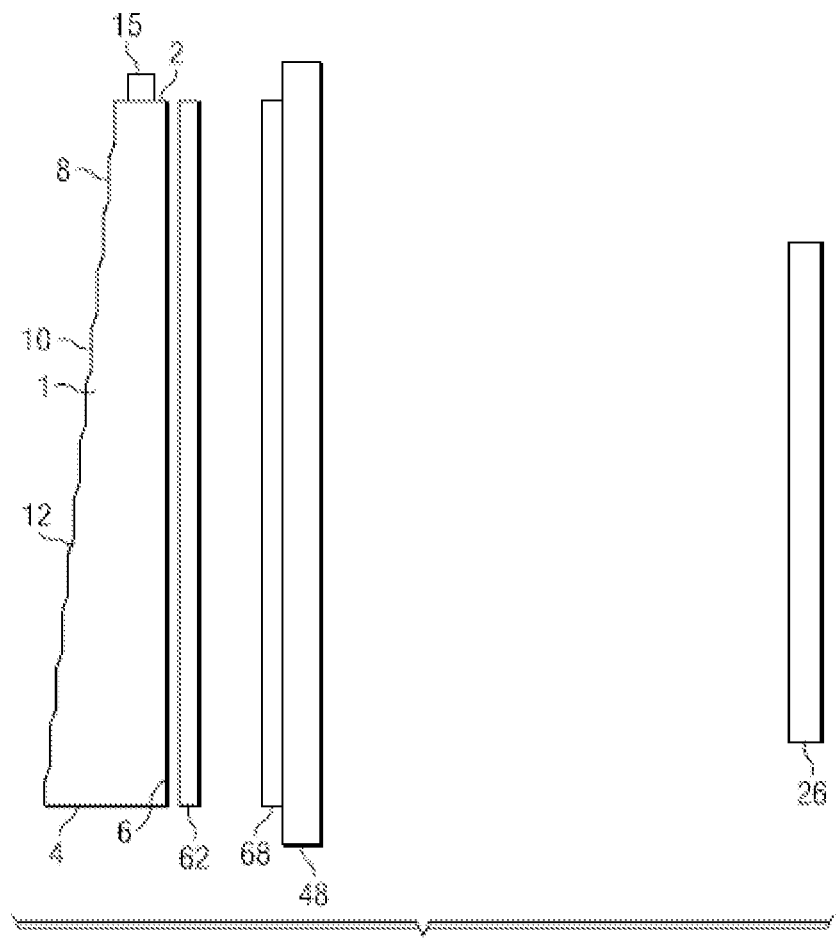
FIG. 10 is a schematic diagram illustrating in side view, the structure of a time multiplexed directional display device, in accordance with the present disclosure.

FIG. 10 is a schematic diagram illustrating in side view the structure of a time multiplexed directional display device which includes a directional backlight. Further, FIG. 10 shows in side view an autostereoscopic display, which may include the stepped waveguide 1 and a Fresnel lens 62 arranged to provide the viewing window 26 for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

Thus, FIGS. 1 to 10 variously describe: a waveguide 1; a directional backlight comprising such a waveguide 1 and an illuminator array 15; and a directional display device including such a directional backlight and an SLM 48. As such the various features disclosed above with reference to FIGS. 1 to 10 may be combined in any combination.

There will now be described some directional backlights, and directional display devices including such directional backlights. In the following description, the components are arranged as described above except for some modifications that will be described. Accordingly, the above description of construction and function applies equally to the following embodiments, but for brevity will not be repeated. Similarly, the various features disclosed below with reference to the following FIGURES may be combined in any combination.

In particular, in the following embodiments, instead of light being extracted from a waveguide after reflection from a reflective end, the light extraction features face the opposite direction and extract light on a first pass. Otherwise the structure and function remains fundamentally as described above. The following backlights are referred to as "inline" directional backlights.

Figure 11:
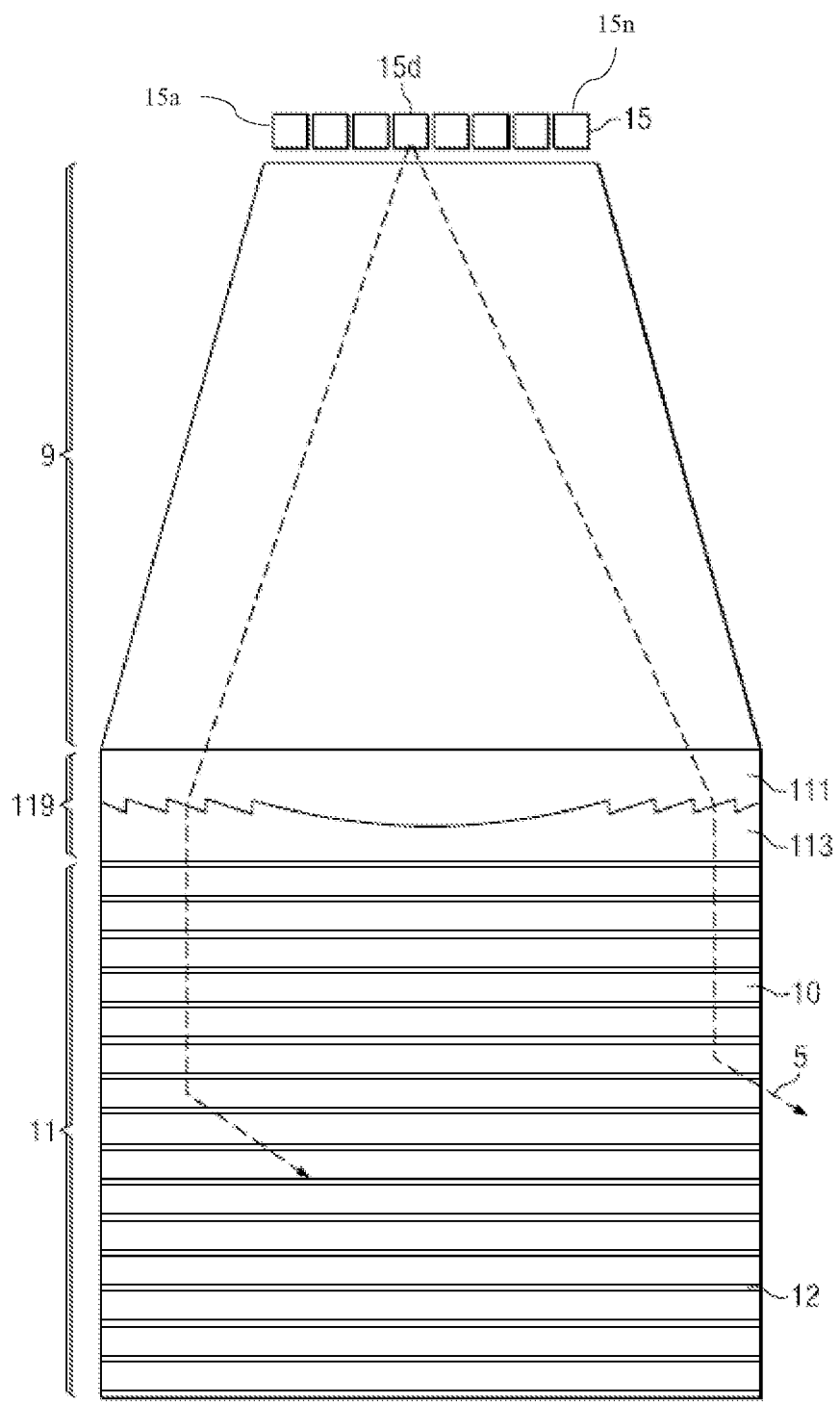
FIG. 11 is a schematic diagram illustrating a front view of an inline directional backlight, in accordance with the present disclosure.

FIG. 11 is a schematic diagram illustrating a front view of an inline directional backlight arranged as follows.

The directional backlight includes an illuminator array 15 as described above. The illuminator elements 15n of the illuminator array 15 are disposed at different input positions in a lateral direction across the input end of a light expansion waveguide section 9 of the directional backlight. The light expansion waveguide section 9 is a waveguide that has opposed guide surfaces that guiding light therealong from the input end and supply the light to a light extraction waveguide section 11.

The light extraction waveguide section 11 is coupled to light expansion waveguide section 9 through a lens element 119 so that it receives light from the light expansion waveguide section 9. Thus light expansion waveguide section 9 and the light extraction waveguide section 11 are continuous without any air gap.

The light extraction waveguide section 11 is a waveguide that has a similar construction to the waveguide 1 as described above, except that the light extraction features 12 face the light expansion waveguide section 9. The light extraction features 12 are oriented to reflect light in directions allowing exit through the first guide surface, but on the initial pass through the light extraction waveguide section 11, without reflection from a reflective end. Thus, the output light is directed into optical windows in output directions distributed in the lateral direction that are dependent on the input positions of the illuminator elements 15n, in the same manner as described above. In this example, the light extraction features 12 extend linearly in the lateral direction.

In particular the inline directional backlight may operate in a similar manner to the waveguide 1 described above, with the difference that light may not be reversed at the reflective end. Instead, the inline directional backlight may allow input light to fan out or expand in the lateral direction within the light expansion waveguide section 9 before converging the light approximately half way down its length into the light extraction waveguide section 11 containing light extraction features 12 and in which light may be directed out of the light extraction waveguide section 11 and into an optical window, towards an observer.

For example, light emitted from an illuminator element 15d (e.g., LED) may expand within a guiding region 9 before being redirected with the lens element 119. Light extraction features 12 may extract the light between guiding regions 10 to provide directed rays 5, which may converge to form viewing windows in a similar manner to the optical valve. Effectively, the inline directional backlight can be constructed and may operate as an unfolded optical valve in which the reflecting mirror 4 may be replaced by the lens element 119.

The lens element 119 has positive optical power in the lateral direction and acts as a window forming optical element which converges the light from an illuminator element 15n into an optical window.

In this example, the lens element 119 includes two bodies 111 and 113 of materials that have different refractive indexes and an interface shaped as a lens surface such as a Fresnel lens surface. In one example, the body 111 adjacent the light expansion waveguide section 9 may be provided by the same material as the light expansion waveguide section 9, and may be integral therewith, whereas the body 113 adjacent the light extraction waveguide section 11 may be provided by a material of a lower refractive index such as silicones, fluorinated materials, aerogels, and so forth.

In this example, light expansion waveguide section 9 may be tapered, so that as it widens in the lateral direction from the illuminator array 15 towards the aperture of the light extraction waveguide section 11, and light outside this region may be lost. This saves material cost. Advantageously, the light transmission of this embodiment may be improved, and the thickness of the lens element 119 can be reduced.

FIG. 12 is a schematic diagram illustrating a side view of an inline directional backlight 2001 that may have the same construction as the embodiment of FIG. 11. The operation of an inline directional backlight 2001 to provide a one dimensional array of viewing windows for use in an autostereoscopic display is illustrated in FIG. 12. The inline directional backlight of FIG. 12 includes a light extraction waveguide section 2009 having an input end 2002. The light extraction waveguide section 2009 may include opposed guide surfaces that are arranged to guide light by total internal reflection, for example by being substantially parallel and planar.

The directional backlight includes a lens element 2004 and a light extraction waveguide section 2011, with a distal end 2003.

FIG. 13 is a schematic diagram illustrating a side view of a detail of the light extraction waveguide section 2011 of the optical directional backlight 2001 of FIG. 12 that comprises opposed, first and second guide surfaces 2006 and 2008 arranged as follows.

The first guide surface 2006 may be arranged to guide light by total internal reflection, for example being a substantially planar surface.

In this example, the second guide surface 2008 has a stepped shape including a plurality of light extraction features 2012 and intermediate regions 2010 intermediate the light extraction features 2012. The intermediate regions 2010 guide light without extracting it by total internal reflection of light, for example being by substantially planar and parallel to the first guide surface 2006, or at a relatively low inclination. The light extraction features 2012 face the light expansion waveguide section 2009 and are oriented to reflect light from the illuminator elements 15n through the first guide surface 2006. The light extraction features 2012 and intermediate regions 2010, respectively, may be arranged in a stepwise manner such that the separation of the first guide surface 2006 and the second guide surface 2008 increases as x increases.

The guiding sides of sections 2009 and 2011 may be substantially parallel planar but may further be tapered so that the TIR angle may change as light propagates therealong. Such an arrangement may advantageously achieve a variation in output uniformity.

The second guide surface 2008 may be an uncoated interface between a high index material such as a plastic, for example, PMMA, PET, PC, or any other known substantially optically transparent plastics and a low index material such as air, silicones, fluorinated materials, aerogels, and so forth. Alternatively, the second guide surface 2008 may be coated, for example with a metal reflective coating over its full area so that the light extraction features 2012 may be reflective for substantially all angles of incidence, and may thus have a tilt angle 2125 of 45 degrees arranged to direct light on-axis towards an observer 2045 for example, substantially without loss. Alternatively, the coating may be a reflective coating patterned so that the light extraction features 2012 are coated to achieve a specular reflection for substantially all angles of incidence while the intermediate regions 2010 may be uncoated to achieve low loss TIR for guiding light rays (compared to the reflection loss that may occur at metallized intermediate regions 2010).

The light extraction features 2012 may be arranged with an approximate tilt angle 2125 of the approximate range 10 to 60 degrees, preferably in the approximate range of 20 to 50 degrees and more preferably in the approximate range of 25 to 45 degrees. Advantageously, light output may be achieved substantially normal to the first guide surface 2006 or may be achieved without metallizing the second guide surface 2008, thus increasing device efficiency.

The light extraction features 2012 and intermediate regions 2010 may further be provided with a pitch that may be different to the pitch of the pixels of an associated spatial light modulator 2048 as described below, so as to minimize the appearance of Moiré fringes.

The height of the light extraction features 2012 may be arranged to provide a substantially uniform output illumination across the area of the light extraction waveguide section 2011. For example, the light extraction features 2012 may have a height of approximately 10 micrometers, an approximate pitch of 150 micrometers and an approximate tilt angle of 35 degrees.

The light expansion waveguide section 2009 may have a height in the direction perpendicular to the lateral direction (vertical in FIG. 12) that is smaller than the height of the lens element 2004 and the height of the light extraction waveguide section 2011 at its input end to advantageously achieve efficient coupling between the two optical elements at the edge of the inline directional backlight.

Light absorbing elements 2007 may be provided around the illuminator array 15 and the input end 2002 of the light extraction waveguide section 2009 to collect light that may not be absorbed in the light extraction waveguide section 2009.

FIGS. 14A-C are schematic diagrams illustrating front and side views of a diffuser 68 that may be arranged extending across the first guide surface of the light extraction waveguide section of any of the embodiments herein. The diffuser 68 may be an asymmetric that is arranged to provide greater angular dispersion of light in a direction (vertical in FIG. 14A) perpendicular to the lateral direction than in the lateral direction (horizontal in FIG. 14A), for example as follows.

As shown in FIG. 14A, the diffuser 68 may comprise extended surface relief features 2304 arranged to achieve wide angle diffusion with cone angle 2300 in the x axis direction as shown in FIG. 14B and small cone angle 2302 in the lateral direction as shown in FIG. 14C. The diffuser 68 may comprise a substrate 2308 and layer 2306 comprising the surface relief features 2304. In an illustrative embodiment, the diffuser 68 may be arranged to form a diffusion angle 2300 of +/−15 degrees in the direction perpendicular to the lateral direction, where the diffusion angle is the cone angle outputted for collimated light ray incident on to the diffuser 68. Advantageously the diffuser 68 may be further arranged to provide mixing of optical windows so that gaps between illuminator elements 15n are substantially not visible in the window plane 106. In a display with a viewing distance between the backlight 100 and window plane 106 of 500 mm, the angular separation of the observer's eyes may be approximately 7 degrees. A lateral diffusion angle of +/−3 degrees may be arranged to spread light of optical windows to achieve high uniformity of viewing windows while achieving low levels of cross talk.

Figure 15:
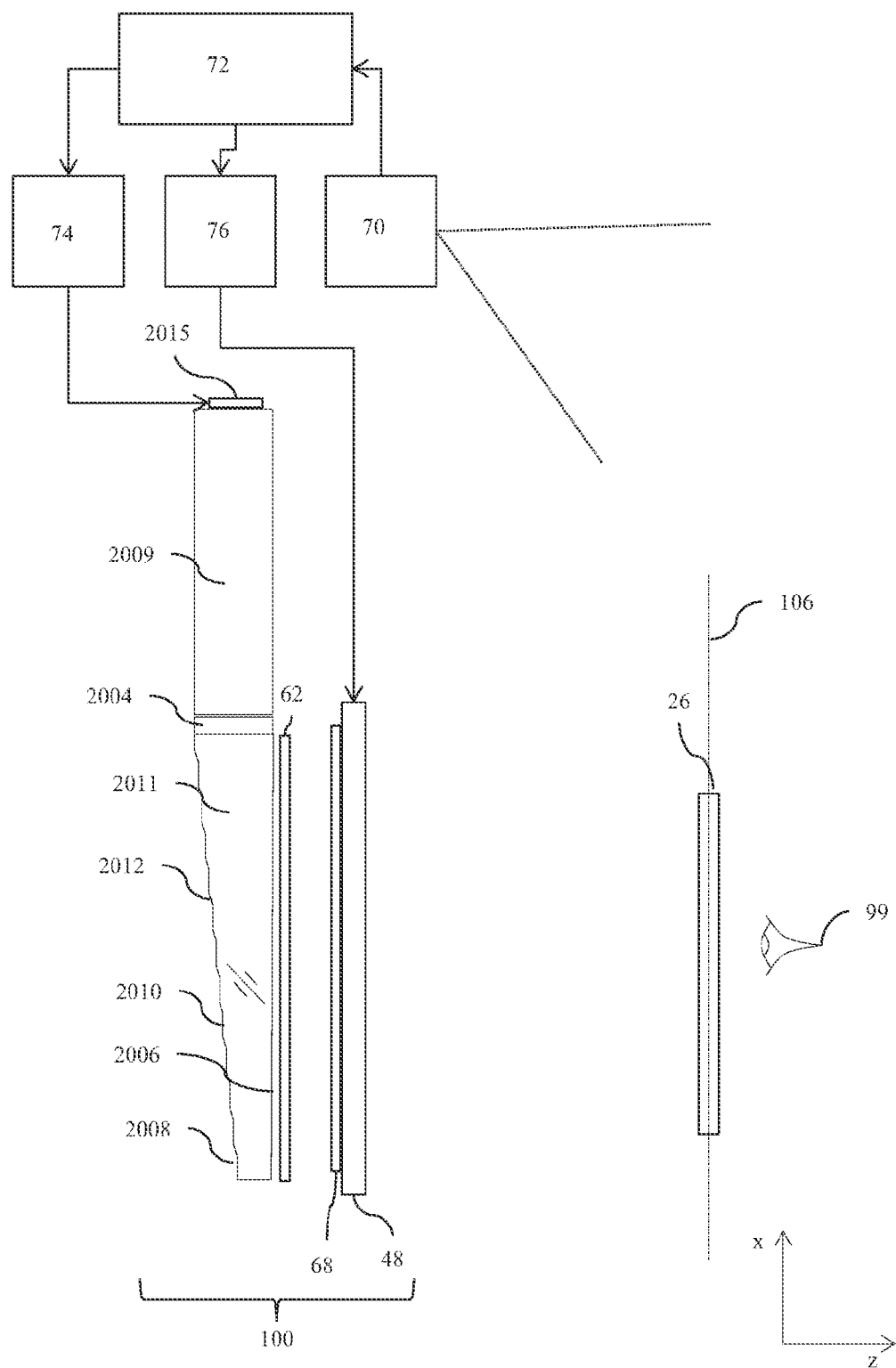
FIG. 15 is a schematic diagram illustrating a directional display apparatus including a display device illuminated by a an inline directional backlight, and including a control system, in accordance with the present disclosure.

FIG. 15 is a schematic diagram illustrating a directional display apparatus including a display device illuminated by an inline directional backlight. The directional display apparatus also includes a control system. The arrangement and operation of the control system will now be described and may be applied, mutatis mutandis, to each of the display devices disclosed herein.

As illustrated in FIG. 15, a directional display device 100 may include an inline directional backlight device that is arranged as shown in FIG. 12 and described above. The directional display device 100 may further include an SLM 48 and a diffuser 68 that each extend across the first guide surface 2006 of the light extraction waveguide section 2012.

Optionally, a Fresnel lens 62 may be provided extending across the first guide surface 2006 of the light extraction waveguide section 2012. The Fresnel lens 62 may act as a window forming optical element arranged to converge light in the lateral directions into the optical windows. Whilst the Fresnel lens 62 could in principle replace the lens element 2004, when both the lens element 2004 and the Fresnel lens are provided, they to cooperate to achieve optical windows 26 at a viewing plane 106 observed by an observer 99. The control system may comprise a sensor system arranged to detect the position of the observer 99 relative to the display device 100. The sensor system comprises a position sensor 70, such as a camera, and a head position measurement system 72 that may for example comprise a computer vision image processing system. The control system may further comprise an illumination controller 74 and an image controller 76 that are both supplied with the detected position of the observer supplied from the head position measurement system 72.

The illumination controller 74 selectively operates the illuminator elements 15 to direct light to into the viewing windows 26 in cooperation with waveguides 2009, 2004, 2011. The illumination controller 74 selects the illuminator elements 2015 to be operated in dependence on the position of the observer detected by the head position measurement system 72, so that the viewing windows 26 into which light is directed are in positions corresponding to the left and right eyes of the observer 99. In this manner, the lateral output directionality of the waveguide 2009, 2004, 2011 corresponds with the observer position.

The image controller 76 controls the SLM 48 to display images. To provide an autostereoscopic display, the image controller 76 and the illumination controller 74 may operate as follows. The image controller 76 controls the SLM 48 to display temporally multiplexed left and right eye images. The illumination controller 74 operate the illuminator elements of light source array 2015 to direct light into respective viewing windows in positions corresponding to the left and right eyes of an observer synchronously with the display of left and right eye images. In this manner, an autostereoscopic effect is achieved using a time division multiplexing technique.

Figure 16:
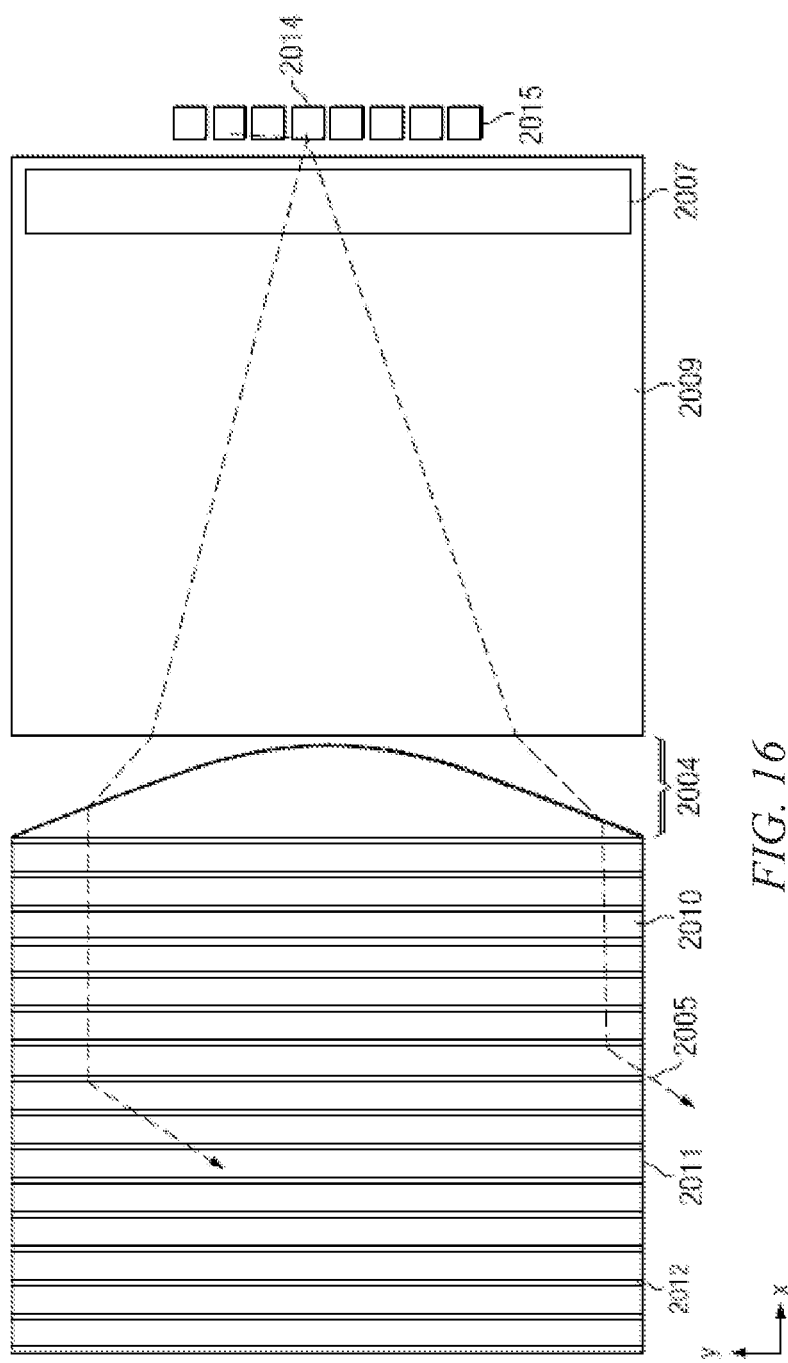
FIG. 16 is a schematic diagram illustrating a front view of an inline directional backlight, in accordance with the present disclosure.

FIG. 16 is a schematic diagram illustrating a front view of an alternative inline directional backlight. This has the same construction as that of FIG. 12 but with the following modifications.

The light expansion waveguide section 2009 and the light extraction waveguide section 2011 have a gap therebetween. The lens element 2004 is formed by the input end of the light extraction waveguide section 2011 being shaped as a lens surface. Otherwise the construction and operation are the same as described above.

As shown in FIG. 16, light rays 2005 may be emitted from an illuminator element 2014 of the illuminator array 2015, located at different input positions in the lateral direction (y direction) along the surface of the input end 2002 at approximately x=0 of the light expansion waveguide section 2009. Light rays 2005 may propagate along x within the light expansion waveguide section 2009 while at the same time may fan out laterally in the xy plane until, upon reaching the output end of the light expansion waveguide section 2009, may be incident on the lens element 2004. The light extraction features 2012 in the light extraction waveguide section 2011, may be direct light substantially normal to the xy display plane with the xz angular spread again substantially maintained relative to the propagation direction. This angular spread may be increased when light exits the light extraction waveguide section 2011 through refraction.

For uncoated light extraction features 2012, reflection may be reduced when total internal reflection (TIR) fails, thus "squeezing" the x-y angular profile and shifting off normal, whereas silver coated extraction features may preserve the increased angular spread and also may substantially preserve the central, normal direction. In the xz plane, light rays 2005 may exit the waveguide region 2011 near collimated and directed off normal in proportion to the y-position of the source light source array 2015 LED from the input edge center.

Figure 17:
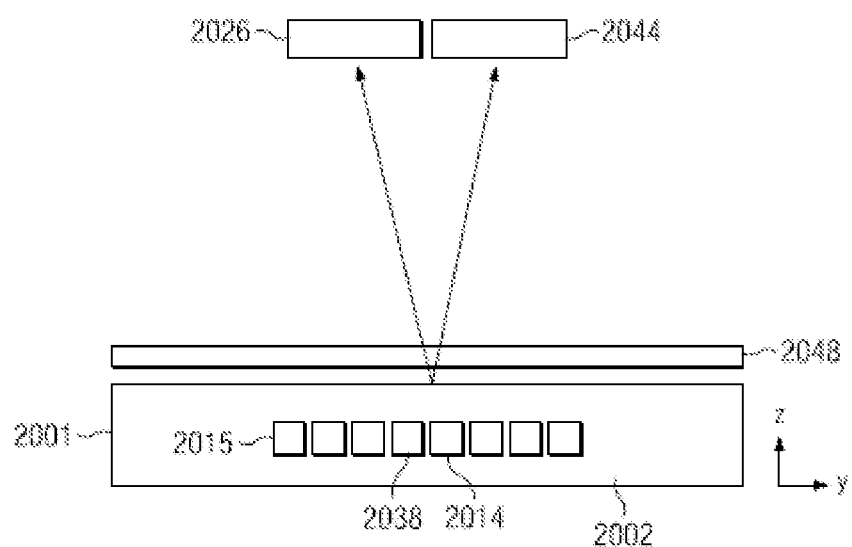
FIG. 17 is a schematic diagram illustrating a top view of an inline directional display device and viewing windows, in accordance with the present disclosure.

FIG. 17 is a schematic diagram illustrating a top view of an inline directional backlight 2001 of the type described above and viewing windows 2026 and 2044 formed thereby. Having independent illuminator elements 2014 of illuminator array 2015 along the input end 2002 may then enable light to exit from the entire directional backlight 2001 and propagate at different external angles as illustrated in FIG. 17. Thus light from illuminator element 2014 may be directed to viewing window 2026 in the z direction, while light from element 2038 may be directed to viewing window 2044.

The inline directional backlight display may be arranged to operate in a similar manner to that shown in FIG. 9. Illuminating a spatial light modulator (SLM) 2048 such as a fast liquid crystal display (LCD) panel with such a device may enable autostereoscopic 3D. The light extraction waveguide section 2011 of an inline directional backlight 2001 may be located behind a fast >100 Hz LCD panel SLM 2048 that displays sequential right and left eye images. In synchronization, specific light emitting elements of the illuminator array 2015 may be turned on and off providing illuminating light that enters right and left eyes independently by virtue of the system's directionality. Illuminator elements 2014 of the illuminator array 2015 may be turned on together giving a one dimensional viewing window 2026, such as an optical pupil with limited width in the horizontal direction but extended in the vertical (x) direction. If a first eye is in viewing window 2026 a left eye image may be seen, and if a second eye is in viewing window 2044 a right eye image may be seen. If the viewing windows 2026, 2044 are extended to either side, an observer positioned off-axis may see a single image in each eye. In this way 3D is sensed when the head of observer 2045 is approximately centrally aligned but movement to the side may result in the scene collapsing onto a 2D image.

Figure 18:
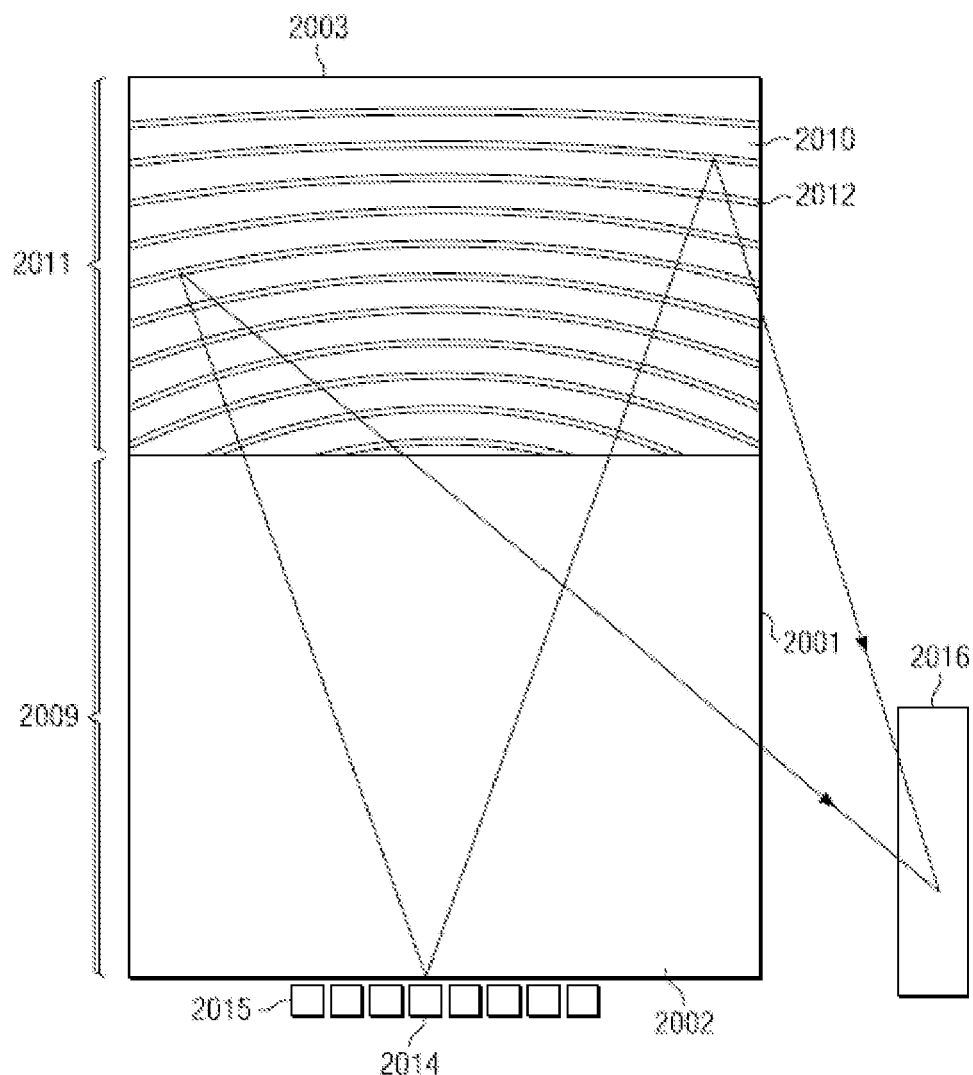
FIG. 18 is a schematic diagram illustrating the formation of an optical window by a further inline directional backlight, in accordance with the present disclosure.

FIG. 18 is a schematic diagram illustrating the formation of an optical window by an inline directional backlight. This has the same construction as that of FIG. 12 but with the following modifications.

FIG. 18 shows an embodiment in which the lens element 2004 is omitted so that non-collimated light may be incident on light extraction features 2012. In this embodiment the light expansion waveguide section 2009 and the light extraction light expansion waveguide section 2011 are continuous and may be formed by sections of a common waveguide, or may be separately formed and attached together.

The light extraction features 2012 extend in the lateral direction but with a curved shape to provide positive optical power in the lateral direction. The light extraction features 2012 may act as a window forming optical element by converging light in the lateral directions into the optical windows. Optionally, the light extraction features 2012 may cooperate to provide this window forming effect with a Fresnel lens 62 as described above and/or the lens element 2004 which may be retained. The size of the optical window 2016 in a window plane may vary along the length of the region 2011, however if the region 2009 is longer than the region 2011, the relative change in size of the optical window 2016 along the length of the region 2011 may be reduced in comparison to arrangements wherein the lengths are the same (for example in the stepped waveguide arrangement of FIG. 1B). Advantageously the arrangement can achieve a simpler construction and lower cost and may achieve a wide viewing angle.

The curvature of the light extraction features 2012 may vary depending on the distance from the array 2015 which may provide imaging of the array 2015 from points across the area of the inline directional backlight. Light that is incident on the light extraction features 2012 may thus be deflected by an angle that is dependent on the position in the region 2011. An illuminator element may be imaged by the light extraction features 2012 onto a window 2026 in the window plane, an area which observers are positioned. A first group of features 2012 at the end of region 2011 may achieve a window separation at the window plane that may be lower than a second group of features 2012 nearer to the array 2015. Thus, the height of the light extraction waveguide section 2011 may be controlled to achieve a small variation in window size at the window plane, increasing viewing freedom. Advantageously such an arrangement removes the optical element 2004 thus increasing output efficiency and reducing complexity.

Alternatively, a lens element 2004 may be provided in addition to the curved light extraction features 2012, advantageously improving the aberrational performance of the system, and achieving telecentric illumination of the curved features 2012.

Figure 19:
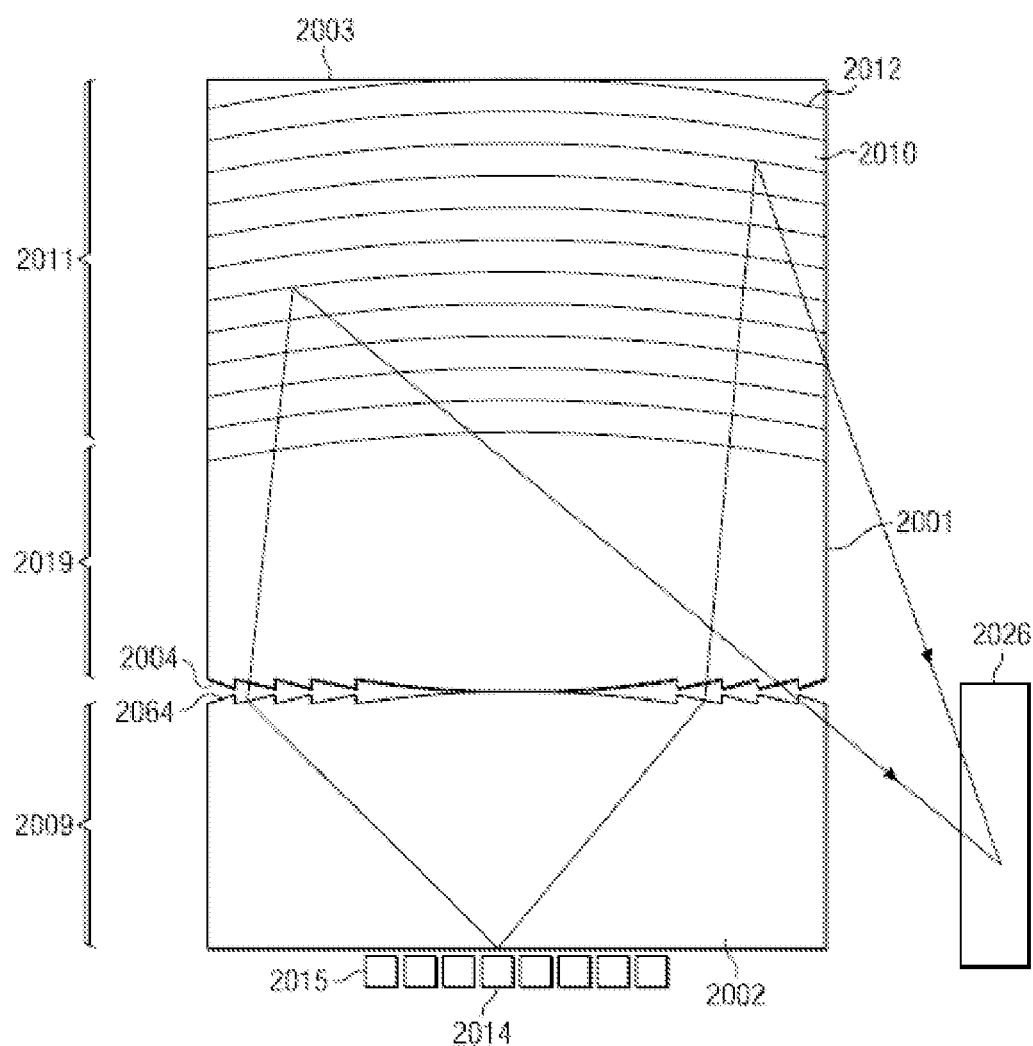
FIG. 19 is a schematic diagram illustrating the formation of a viewing window by another inline directional backlight, in accordance with the present disclosure.

FIG. 19 is a schematic diagram illustrating the formation of a viewing window by a further inline directional backlight. This has the same construction as that of FIG. 16 but with the following modifications.

Instead of just the input end of the light extraction waveguide section 2011 being shaped as a lens surface, the lens element 2004 is formed by both the output end 2064 of the light expansion waveguide section 2009 and the input end 2004 of the light extraction waveguide section 2011 being shaped as lens surfaces, in this example a Fresnel lens surfaces.

Further, the light extraction waveguide section 2011 has said stepped shape in a light extraction region and further comprises a light guiding region 2019 arranged between the light extraction region and the light expansion waveguide section 2009. This allows the structure of the Fresnel features on ends 2064, 2004 to be separated from the light extraction features 2012, improving uniformity of the output illumination across the display surface. Further the window size may be substantially constant for substantially most to all points across the display area, and an output Fresnel lens 2062 may not be employed, reducing cost and complexity.

Figure 20:
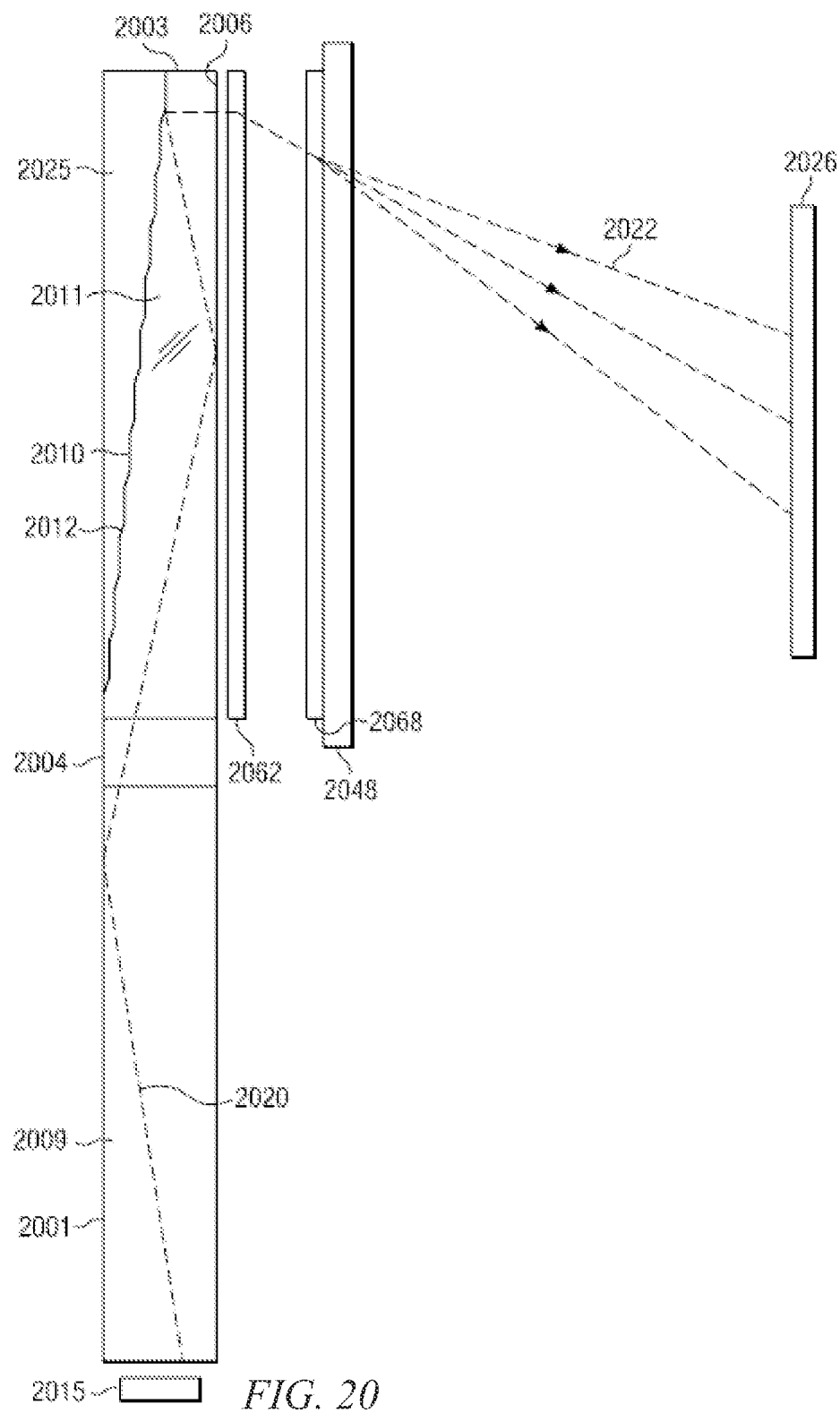
FIG. 20 is a schematic diagram illustrating a side view of a directional display device which includes an inline directional backlight, in accordance with the present disclosure.

FIG. 20 is a schematic diagram illustrating a side view of a display device which includes an inline directional backlight 2001. This has the same construction as that of FIG. 15 but with the following modifications.

Light ray 2020 from illuminator array 2015 may be directed through light expansion waveguide section 2009 and into the light extraction waveguide section 2011 and may be extracted by the light extraction features 2012. Light rays that are not deflected may be incident on the distal end 2003 of the light extraction waveguide section 2011 and may be absorbed. That distal end 2003 may preferably have a thickness that is small compared to the thickness of the input end 2002 of the light extraction waveguide section 2011 to advantageously optimize efficiency and reduce cross talk. In an illustrative embodiment, the input end 2002 may have a thickness of approximately 2 mm, while the distal end 2003 may have a thickness of less than approximately 0.5 mm.

To increase the mechanical stability of this end, for example, the second guide surface 2008 may be metallized and a stabilization layer 2025 incorporated extending thereacross.

Light rays 2020 may be substantially collimated by features 2012 and may be incident on Fresnel lens 2062 so that a window 2026 may be substantially formed in the plane of the window 2026. Advantageously the distal end 2003 may have a minimal thickness to increase efficiency and reduce cross talk due to back reflections at this side in comparison to optical valve arrangements.

Diffuser 2068 may be an asymmetric diffuser as described above such that light rays incident on diffuser 2068 may be diffused in the vertical (x) direction to provide ray bundle 2022, but have little, or controlled diffusion in the lateral (y) direction. Advantageously, the diffuser can further achieve diffusion of the structure of the Fresnel lens and facets so that beating between the structure and the pixels of the SLM 2048 is substantially minimized.

In the present embodiments, the light extraction section and light expansion section may further comprise a folding mirror arrangement therebetween to achieve a folding of the structure, reducing the dimensions of the system and forming a folded optical system. Single and double folds may be provided to achieve L-shaped structures and U-shaped structures.

Figure 21:
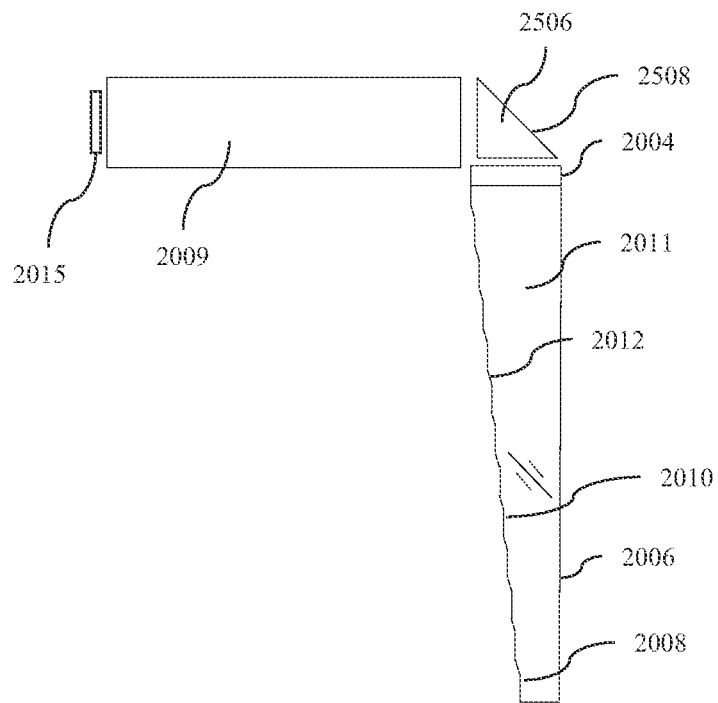
FIG. 21 is a schematic diagram illustrating a side view of a folded inline directional backlight, in accordance with the present disclosure.

FIG. 21 is a schematic diagram illustrating a side view of a folded inline directional backlight. A folding mirror arrangement 2506 may comprise a right angled prism and may achieve reflection at side 2508. Alternatively side 2508 may be replaced by a reflective mirror (such as a metal mirror or ESR™ from 3M Corporation) in air or other material. Advantageously the width of the inline directional backlight may be reduced.

Figure 22:
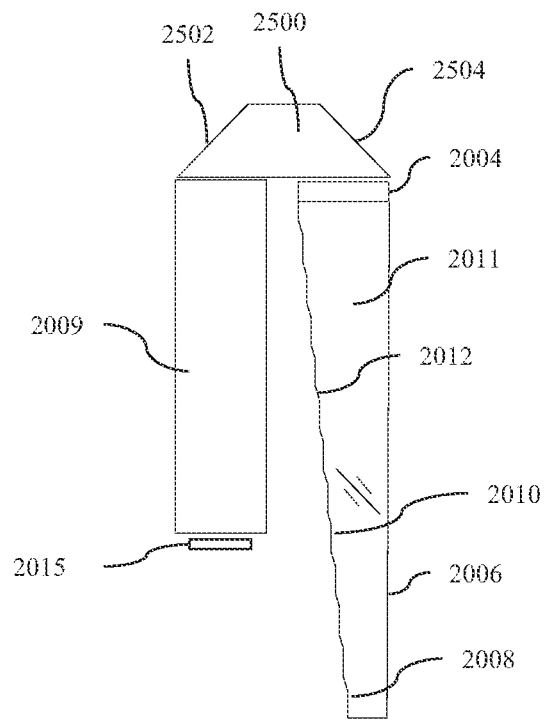
FIG. 22 is a schematic diagram illustrating a side view of a folded inline directional backlight, in accordance with the present disclosure.

FIG. 22 is a schematic diagram illustrating a side view of a folded inline directional backlight. The folding mirror arrangement may comprise prism 2500 with reflective sides 2502, 2506. The expansion section 2009 may be arrange substantially parallel to the light extraction section 2011 and advantageously the thickness of the inline directional backlight may be reduced to provide a more compact arrangement for display illumination.

The lens element 2004 may be arranged with the expansion section 2009, extraction section 2011 or between reflective sides of the folding mirror arrangement.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A directional backlight comprising:
    an array of light sources;
    a light expansion waveguide section having an input end and opposed guide surfaces for guiding light along the waveguide, the array of light sources disposed at different input positions in a lateral direction across the input end of the light expansion waveguide section;
    a light extraction waveguide section arranged to receive light from the light expansion waveguide section; and
    a lens element arranged between the light expansion waveguide section and the light extraction waveguide section, the lens element having positive optical power in the lateral direction,
    wherein the light extraction waveguide section comprises first and second opposed guide surfaces for guiding light along the light extraction waveguide section, the first guide surface being arranged to guide light by total internal reflection and the second guide surface having a stepped shape comprising a plurality of facets and intermediate regions intermediate the facets, wherein
    the intermediate regions are arranged to direct light through the light extraction waveguide section without extracting it, and
    the facets extend in the lateral direction facing the light expansion waveguide section, are oriented to reflect light guided through the light extraction waveguide section in directions allowing exit through the first guide surface, and are curved to provide positive optical power in the lateral direction, the positive optical power in the lateral direction of the lens element and the positive optical power in the lateral direction of the facets being arranged to converge the input light such that the light that exits through the first guide surface is directed into optical windows in output directions distributed in the lateral direction that are dependent on the input positions of the light sources.

2. A directional backlight according to claim 1, wherein the lens element comprises two bodies of different refractive index having an interface shaped as a lens surface.

3. A directional backlight according to claim 1, wherein the light expansion waveguide section and the light extraction waveguide section have a gap between them, and the lens element is formed by at least one of an input end of the light extraction waveguide section and an output end of the light expansion waveguide section being shaped as a lens surface.

4. A directional backlight according to claim 1, wherein the light expansion waveguide section and the light extraction waveguide section have a gap between them.

5. A directional backlight according to claim 1, wherein the light expansion waveguide section and the light extraction waveguide section are continuous.

6. A directional backlight according to claim 1, further comprising a diffuser extending across the first guide surface of the light extraction waveguide section.

7. A directional backlight according to claim 6, wherein the diffuser is an asymmetric diffuser that provides greater angular dispersion of light in a direction perpendicular to the lateral direction than in the lateral direction.

8. A directional backlight according to claim 1, wherein the light expansion waveguide section widens in the lateral direction in the direction from the array of light sources to the light extraction waveguide section.

9. A directional backlight according to claim 1, wherein the light expansion waveguide section has a height in the direction perpendicular to the lateral direction that is smaller than the height of the light extraction waveguide section at an input end that is arranged to receive light from the light expansion waveguide section.

10. A directional backlight according to claim 1, wherein the light extraction waveguide section has said stepped shape in a light extraction region and further comprises a light guiding region between the light extraction region and the light expansion waveguide section wherein the first guide surface is arranged to direct light through the waveguide without extracting it.

11. A display device comprising:
a directional backlight according to claim 1; and
a transmissive spatial light modulator arranged to receive the light output from the light extraction waveguide section and to modulate it to display an image.

12. A display apparatus comprising:
a display device according to claim 11; and
a control system arranged to selectively operate the light sources to direct light into varying optical windows.

13. A display apparatus according to claim 12, wherein
the control system further comprises a sensor system arranged to detect the position of an observer across the display device, and
the control system is arranged to selectively operate the light sources to direct the light into varying optical windows in dependence on the detected position of the observer.

14. A display apparatus according to claim 13, being an autostereoscopic display apparatus wherein the control system is further arranged to control the display device to display temporally multiplexed left and right images and synchronously to selectively operate the light sources to direct the displayed left and right images into varying optical windows in positions corresponding to left and right eyes of an observer in dependence on the detected position of the observer.

* * * * *